US012409092B2

(12) United States Patent
Hao et al.

(10) Patent No.: US 12,409,092 B2
(45) Date of Patent: Sep. 9, 2025

(54) REHABILITATION TRAINING EQUIPMENT AND A REHABILITATION TRAINING SYSTEM

(71) Applicants: Xuanwu Hospital Capital Medical University, Beijing (CN); Beijing Municipal Geriatric Medical Research Center, Beijing (CN)

(72) Inventors: Junwei Hao, Beijing (CN); Haijie Liu, Beijing (CN); Teng Chen, Beijing (CN); Dongshan Wan, Beijing (CN); Fei Wang, Beijing (CN); Fang Xu, Beijing (CN); Ming Lin, Beijing (CN)

(73) Assignees: XUANWU HOSPITAL CAPITAL MEDICAL UNIVERSITY, Beijing (CN); BEIJING MUNICIPAL GERIATRIC MEDICAL RESEARCH CENTER, Beijing (CN)

( * ) Notice: Subject to any disclaimer, the term of this patent is extended or adjusted under 35 U.S.C. 154(b) by 1140 days.

(21) Appl. No.: 17/333,099

(22) Filed: May 28, 2021

(65) Prior Publication Data

US 2021/0369532 A1 Dec. 2, 2021

(30) Foreign Application Priority Data

May 28, 2020 (CN) ......................... 202020934026.4
May 18, 2021 (CN) ......................... 202110538544.3

(Continued)

(51) Int. Cl.
*A61H 1/02* (2006.01)

(52) U.S. Cl.
CPC ......... *A61H 1/0218* (2013.01); *A61H 1/0237* (2013.01); *A61H 2201/1238* (2013.01);
(Continued)

(58) Field of Classification Search
CPC ...... A61H 1/00; A61H 1/0218; A61H 1/0237; A61H 2201/1238; A61H 2201/1246;
(Continued)

(56) References Cited

U.S. PATENT DOCUMENTS 4,255,822 A * 3/1981 Dixon .................... A63B 25/06 482/75
5,088,476 A * 2/1992 Burton ................. A61H 1/0229 606/241

(Continued)

FOREIGN PATENT DOCUMENTS

CN 109395333 A * 3/2019 ........... A63B 26/003
DE 102009059250 A1 * 6/2011 ............. A61H 1/001

(Continued)

OTHER PUBLICATIONS

Matsumura, English Translation of "JP H11235359 A", Aug. 31, 1999 (Year: 1999).*

(Continued)

*Primary Examiner* — Tu A Vo
*Assistant Examiner* — Kelsey E Baller
(74) *Attorney, Agent, or Firm* — Carter, DeLuca & Farrell LLP

(57) ABSTRACT

A rehabilitation training system. The A rehabilitation training equipment includes a driving device, a back placement device, a leg aid device, a cushion device, a first feedback device, and a control device. The driving device is configured to adjust rotation angles between the back placement device, the cushion device, and the leg aid device to achieve a posture training mode selected from a plurality of posture training modes including a standing mode, a sitting-up mode, and a lying mode. The first feedback device is used to obtain core muscle strength parameters of the human body. The control device is electrically connected to the first (Continued)

feedback device and the driving device, and is configured to obtain the core muscle strength parameters and send a control signal to the driving device.

22 Claims, 8 Drawing Sheets

(30) Foreign Application Priority Data

May 18, 2021 (CN) ......................... 202110538553.2
May 18, 2021 (CN) ......................... 202121058667.9
May 18, 2021 (CN) ......................... 202121058955.4

(52) U.S. Cl.
CPC ................ *A61H 2201/1621* (2013.01); *A61H 2201/1623* (2013.01); *A61H 2201/1642* (2013.01); *A61H 2203/0406* (2013.01); *A61H 2203/0431* (2013.01); *A61H 2203/0456* (2013.01); *A61H 2230/605* (2013.01)

(58) Field of Classification Search
CPC .... A61H 2201/1621; A61H 2201/1623; A61H 2201/1642; A61H 2203/0406; A61H 2203/0431; A61H 2203/0456; A61H 2230/605; A61H 23/0263; A61H 1/0281; A61H 1/02; A61H 1/0274; A61H 3/008; A61H 1/0266; A61H 1/0292; A61H 1/0277; A61H 1/024; A61H 2201/0138; A61H 2201/0142; A61H 2201/0149; A63B 21/00181; A63B 21/00178; A63B 71/0622; A63B 24/00; A63B 26/003; A61G 7/0573; A61G 15/007; A61G 7/16; A61G 7/015; A61G 5/14; A61G 7/005; A61G 7/018; A61G 13/02; A61G 13/08; A61G 7/00; A47C 1/03233; A47C 1/035; A47C 20/041; A47C 20/46
USPC .......................... 482/131, 907; 601/1, 23–24
See application file for complete search history.

(56) References Cited

U.S. PATENT DOCUMENTS 5,380,034 A * 1/1995 Wilson ................... A61G 7/053 297/29
6,013,043 A * 1/2000 Forner ............... A63B 21/4015 602/23
6,154,690 A * 11/2000 Coleman .................. A61G 5/14 701/34.2
7,083,019 B2 * 8/2006 Chiou ...................... B60K 1/00 180/907
7,104,346 B2 * 9/2006 Schaffner ............... A61G 5/042 280/755
7,500,689 B2 * 3/2009 Pasternak ............ A61G 5/1094 297/188.08
8,985,600 B2 * 3/2015 Nyitray ................ A61G 5/1056 280/47.41
2007/0275358 A1 * 11/2007 Nakanishi .............. A61H 1/003 434/247
2008/0132383 A1 * 6/2008 Einav ............... A63B 21/00181 482/8
2008/0242521 A1 * 10/2008 Einav ...................... G16H 20/30 482/110
2012/0298113 A1 * 11/2012 Hruska .................. A61H 1/001 128/845
2013/0171600 A1 * 7/2013 Yuasa .................. A61B 5/1036 434/258
2014/0364784 A1 * 12/2014 Hyde .................... A61B 5/1116 602/19
2015/0250675 A1 * 9/2015 Kalinowski ........ A63B 21/4034 482/69
2015/0328497 A1 * 11/2015 Doucot ............. A63B 69/0057 482/146
2016/0256737 A1 * 9/2016 Yoshioka ........... A63B 23/0405
2018/0133088 A1 * 5/2018 Hou ................. A63B 21/00181
2018/0221226 A1 * 8/2018 Moore ................... A61G 5/128
2019/0344434 A1 * 11/2019 Lerner ................. A61B 5/6812
2020/0229998 A1 * 7/2020 Paz ........................ G16H 40/63

FOREIGN PATENT DOCUMENTS

JP H11235359 A * 8/1999
JP 2006149792 A * 6/2006

OTHER PUBLICATIONS

Kaneko, English Translation of "17333099_2025-01-15_JP_2006149792_A_I.pdf", Jun. 15, 2006 (Year: 2006).*
Hartard, English Translation of "DE 102009059250 A1", Jun. 22, 2011 (Year: 2011).*
An, English Translation of "CN 109395333 A", Mar. 1, 2019 (Year: 2019).*

* cited by examiner

REHABILITATION TRAINING EQUIPMENT AND A REHABILITATION TRAINING SYSTEM

TECHNICAL FIELD

The disclosure relates to medical-related technical field, and more specifically, relates to a rehabilitation training equipment and a rehabilitation training system.

BACKGROUND

A variety of neurological diseases such as stroke and myelitis can cause severe movement disorders. Early rehabilitation training can reduce risks of lower limb venous thrombosis, crash pneumonia, pressure ulcers, etc., in bedridden patients, and at the same time, it is essential for compensatory remodeling of a central nervous system and reconstruction of a motion function. Therefore, the early rehabilitation training is a core content for rehabilitation of central nervous system diseases. In the currently commonly used therapy, it is advocated that a therapist places his/her hands on specific sites of a patient's torso and limbs and controls the postures or movements of these parts with the hands during a treatment, thereby preventing abnormal posture reflexes and movement patterns of the patient, and activating or introducing normal postural reflexes and movement patterns. The middle and lower part of a sternum is the central control point of a body, plays a key role in maintaining stability of a central part of the body, and secondly, the control of shoulders, a pelvis, and feet is also essential.

A core muscle group refers to an important muscle group that surrounds the body in the front and back of an abdomen and is responsible for maintaining the stability of a spine, and includes an abdominal muscle group, a lumbar dorsal muscle group, and a pelvic floor muscle group. The strength of the core muscle group is reflected in the difficulty extent of the patient in completing a posture transfer (such as lying-sitting-standing) and in maintaining a posture balance. During rehabilitation of motion function, only after the trunk balance is completed first can the patient provide a possibility for delicate movements (such as walking and grasping) controlled by muscles of the limbs, and at the same time, it can also greatly avoid complications caused by long-term bed rest through autonomous posture transfers. Therefore, in the reconstruction of motion functions of a whole body, strength training of the core muscle group should be given priority and importance. Besides, for bedridden patients, training process of the posture transfer should be gradual, it is necessary to complete a sleeping-sitting training before further transition to sitting-stand training.

Most of the products currently on the market are only suitable for patients who may maintain certain balance and may maintain upright, but not suitable for patients who are bedridden or have mobility difficulties. As an example, foot pedals for rehabilitation of lower limbs training or rotating roulette for upper limbs training, and those products only train the strength of the upper or lower limb muscles, and cannot effectively train the core muscle. A few products involve the rehabilitation of core muscle group, they have a single function and a limited range, and settings of their training modes have nothing to do with the patient's own actual core muscle strength parameters, which results in current products being boring during training, and cannot provide patients with a rich recovery environment, so that patients have low compliance and cannot complete the amount of rehabilitation that should be applied as scheduled.

SUMMARY

In view of the above technical problems in the prior art, the disclosure provides a rehabilitation training equipment and a rehabilitation training system, which can provide users with multiple training modes and help shorten the patient's recovery period.

According to the first aspect of the disclosure, a rehabilitation training equipment is provided, which comprises a driving device, a back placement device and a leg aid device. The rehabilitation training equipment further comprises a cushion device, the opposite sides of which are rotatablely connected to the back placement device and the leg aid device respectively, and the driving device is configured to adjust rotation angles between the back placement device, the cushion device, and the leg aid device, to realize a posture training mode selectable from multiple posture training modes including standing mode, sitting-up mode and lying mode. The rehabilitation training equipment further comprises a first feedback device that is installed at one or more of the back placement device, leg aid device or cushion device, and is configured to obtain core muscle strength parameters of the human body. The rehabilitation training equipment further comprises a control device that is electrically connected to the first feedback device and the driving device, and the control device is configured to obtain the core muscle strength parameters and send a control signal to the driving device.

According to the second aspect of the disclosure, a rehabilitation training equipment is provided. The rehabilitation training equipment comprises a base. The rehabilitation training equipment further comprises a supporting platform provided above the base and used to support an object for rehabilitation training. The rehabilitation training equipment further comprises a disturbance mechanism adapted to the base and the supporting platform. And the rehabilitation training equipment further comprises a control device, which may be configured to control the disturbance mechanism to push the supporting platform to perform a motion at least including a tilt motion relative to the base.

According to the third aspect of the disclosure, a rehabilitation training system is provided, which may comprises the rehabilitation training equipment in the first aspect and/or the rehabilitation training equipment in the second aspect.

Compared with the prior art, the beneficial effects of the embodiments of the present disclosure are as follows. The driving device of the disclosure adjusts the rotation angles between the back placement device, the cushion device, and the leg aid device, so that the rehabilitation training equipment can achieve training in a posture training mode selectable from multiple posture training modes including the standing mode, the sitting-up mode and lying mode. Patients can complete a variety of posture training modes without help from outsiders, thereby saving labor costs and enriching the rehabilitation environment for patients. Moreover, the control device of the rehabilitation training equipment disclosed in the present application can adjust the rehabilitation training equipment to enter into a posture training mode adapted to the patient's core muscle strength parameters according to the body' core muscle strength parameters acquired by the first feedback device, so that the rehabilitation training equipment can dynamically adjust the posture training mode according to different physical conditions of the patients, so as to quickly help the paralyzed patient to restore the core muscle strength and balance, and help shorten the patient's recovery cycle.

BRIEF DESCRIPTION OF THE DRAWINGS

In the drawings, which are not necessarily drawn to scale, like numerals may describe similar components in different views. Like numerals having letter suffixes or different letter suffixes may represent different instances of similar components. The drawings illustrate generally, by way of example, but not by way of limitation, various embodiments, and together with the description and claims, serve to explain the disclosed embodiments. When appropriate, the same reference numbers are used throughout the drawings to refer to the same or like parts.

Such embodiments are demonstrative and not intended to be exhaustive or exclusive embodiments of the present method, device, equipment, or system.

Figure 1:
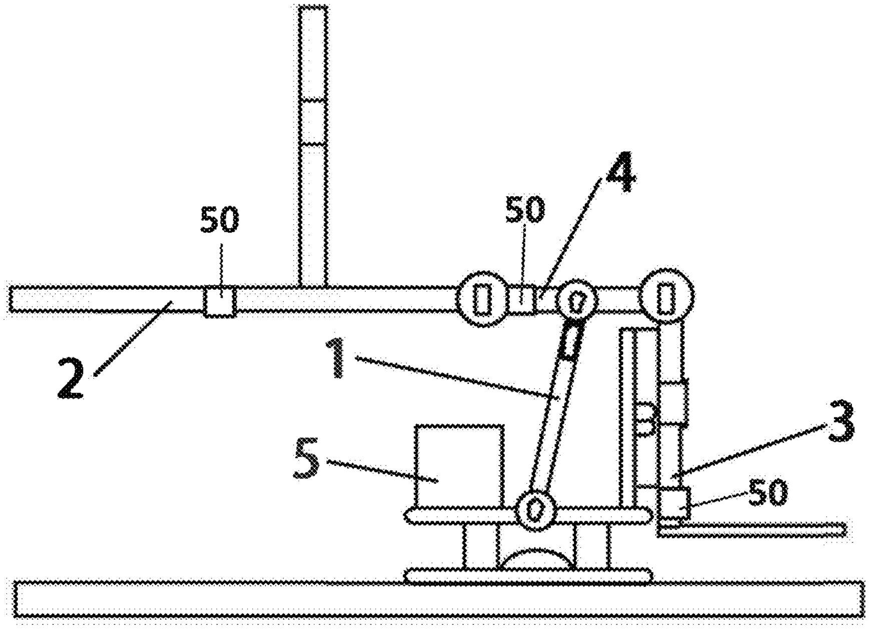
FIG. 1 is a schematic structural diagram of a rehabilitation training equipment in a lying mode according to an embodiment of the disclosure.

The components indicated by the reference signs in the figures:

1—driving device; 101—hydraulic assembly; 102—first motor; 103—first output shaft; 104—second motor; 105—second output shaft; 2—back placement device; 201—backrest; 202—upper body fixing strap; 203—movable mounting base; 204—mounting groove; 205—elastic part; 3—leg aid device; 301—leg support assembly; 302—lower body fixing strap; 303—leg support plate; 3031—vertical plate; 3032—lateral plate; 304—toe cover; 305—fixing plate; 306—heel cover; 307—plugging shaft; 308—socket; 309—fixing sleeve; 4—cushion device; 5—control device; 6—supporting part; 601—abutment part; 7—first gear assembly; 8—second gear assembly; 9—third gear assembly; 10—fourth gear assembly; 11—desk assembly; 1101—desk board; 1102—operation handle; 1103—long arm support; 1104—desk support; 1105—transition support; 1106—control panel; 12—telescopic bracket; 13—support frame; 14—base; 15—disturbance mechanism; 1501—rotating base; 1502—pushing part; 1503—mounting base; 16—object bearing part.

DETAILED DESCRIPTION

In order to enable those skilled in the art to better understand the technical solutions of the present disclosure, the present disclosure will be described in details below in conjunction with the accompanying drawings and specific embodiments. The embodiments of the present disclosure will be described in further details below in conjunction with the accompanying drawings and specific embodiments, but they are not intended to limit the present disclosure.

"First", "second" and similar words used in the present disclosure do not indicate any order, quantity or importance, but are only used to distinguish different components. "Include" or "comprise" and other similar words means that an element appearing before this word covers an element listed after this word, but do not exclude other elements. "Up", "down", "left", "right", etc. are only used to indicate the relative position relationship. When the absolute position of a described object changes, the relative position relationship may also change accordingly.

In the present disclosure, when it is described that a specific device is located between the first device and the second device, there may or may not be an interposed device between the specific device and the first device or the second device. When it is described that a specific device is connected to another device, the specific device may be directly connected to the other device without an interposed device, or may not be directly connected to the other device but with an interposed device.

All terms (including technical terms or scientific terms) used in this disclosure have the same meaning as understood by those of ordinary skill in the art to which this disclosure belongs, unless otherwise specifically defined. It should also be understood that terms such as those defined in general-purpose dictionaries should be interpreted as having meanings consistent with their meanings in the context of related technologies, and should not be interpreted in an idealized or extremely formal sense unless it is clearly defined as such herein.

The technologies, methods, and devices known to those of ordinary skill in the relevant fields may not be discussed in details, but where appropriate, the technologies, methods, and devices should be regarded as a part of the specification.

According to some embodiments of the present disclosure, a rehabilitation training equipment is provided. As shown in FIGS. 1 to 4, the rehabilitation training equipment may include a driving device 1, a back placement device 2 and leg aid device 3. The rehabilitation training equipment also may include a cushion device 4, a first feedback device 50, and a control device 5. Opposite sides of the cushion device 4 are rotatablely connected to the back placement device 2 and the leg aid device 3, respectively. The driving device 1 is configured to adjust rotation angles between the back placement device 2, the cushion plate device 4, and the leg aid device 3, to achieve a posture training mode, which may be selected from various posture training modes including standing mode, sitting-up mode, and lying mode. The first feedback device 50 is provided at one or more of the back placement device 2, the leg aid device 3, or the cushion device 4, and is configured to obtain core muscle strength parameters of a human body. The control device 5 is electrically connected to the first feedback device 50 and the driving device 1, and is configured to obtain the core muscle strength parameters and send a control signal to the driving device 1.

It may be understood that the control device 5 may include a storage storing computer-executable instructions and a processor, wherein the processor may execute the computer-executable instructions to achieve flexible controls (including various control modes and disturbance modes in the various embodiments of the present disclosure) of driving device 1, thereby preparing the back placement device 2, the cushion plate device 4, and the leg aid device 3 ready for desired posture training mode. In some embodiments, the storage may be volatile or non-volatile, magnetic, semiconductor, tape, optical, removable, non-removable, or other types of storage devices or tangible (ie, non-transitory) computer-readable media, including but not limited to ROM, flash storage, dynamic RAM, and static RAM. The storage may be configured to store one or several computer programs that can be executed by the processor to perform functions disclosed herein. In some embodiments, the processor may be a processing device including one or more general processing devices (such as a microprocessor, a central processing unit (CPU), a graphics processing unit (GPU), etc.). More specifically, the processor may be a complex instruction set computing (CISC) microprocessor, a reduced instruction set computing (RISC) microprocessor, a very long instruction word (VLIW) microprocessor, a processor running other instruction sets, or a processor running a combination of instruction sets. The processor may also be one or more dedicated processing devices, such as an application specific integrated circuit (ASIC), a field programmable gate array (FPGA), a digital signal processor (DSP), a system on a chip (SoC), and so on.

It may be understood that the above back placement device 2 may be used to support the patient's back, the cushion device 4 may be used to support the patient's pelvis, and the leg aid device 3 may be used to support the patient's legs.

Figure 2:
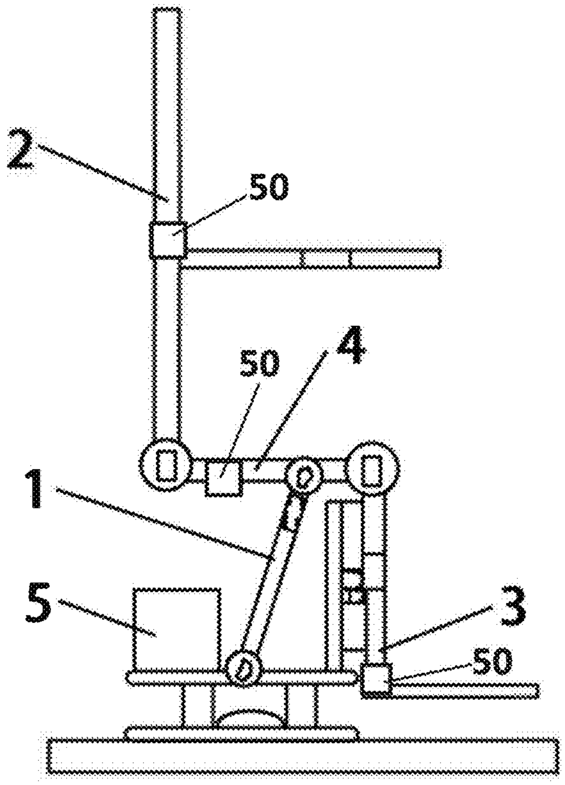
FIG. 2 is a schematic structural diagram of the rehabilitation training equipment in a sitting-up mode according to the embodiment of the disclosure.
Figure 3:
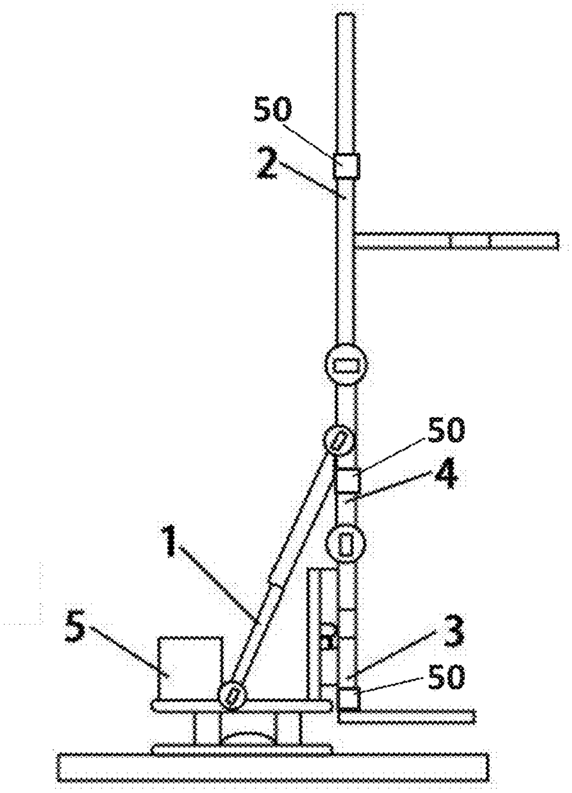
FIG. 3 is a schematic structural diagram of the rehabilitation training equipment in a standing mode according to the embodiment of the disclosure.
Figure 4:
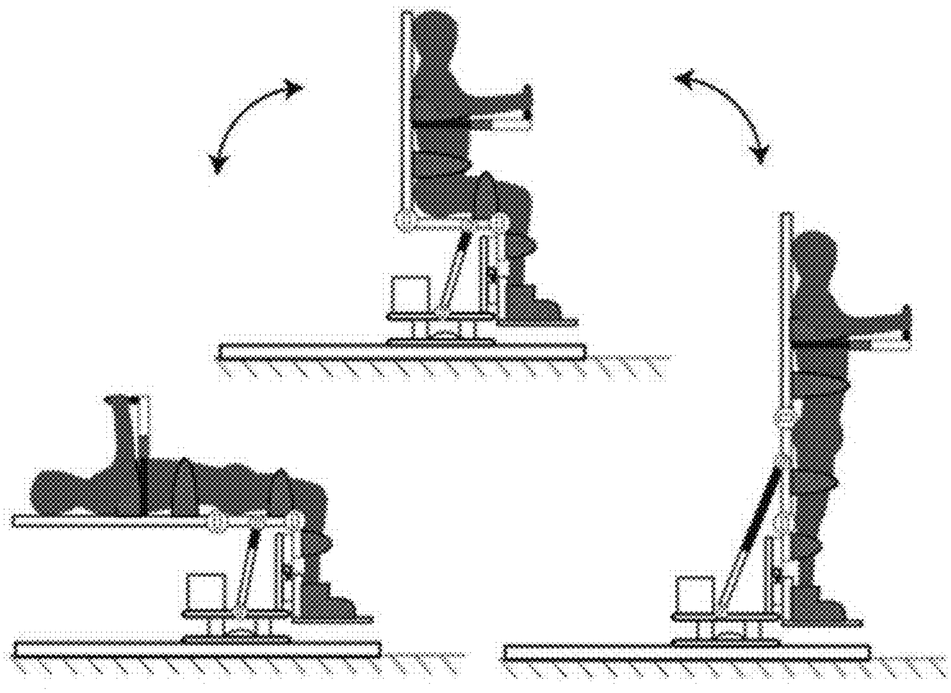
FIG. 4 are diagrams when transferring posture states of the rehabilitation training equipment according to the embodiment of the disclosure.

As shown in FIGS. 1 and 4, when the patient's upper limb and pelvis are both lying flat, then the above back placement device 2 and the cushion device 4 are placed horizontally, and the rehabilitation training equipment is in the lying mode. As shown in FIGS. 2 and 4, when the cushion plate device 4 is placed horizontally while the back placement device 2 rotates upwards to a certain angle relative to the cushion plate device 4, the rehabilitation training equipment has a chair-shaped overall structure, and is in the sitting-up mode at the same time. As shown in FIGS. 3 and 4, when the back placement device 2 and the cushion device 4 are respectively rotated to be placed upright, the patient can stand on the leg aid device 3, and the rehabilitation training equipment now is in the standing mode at the same time. In this manner, the above rehabilitation training equipment may be used to enable the patient to perform lying-sitting-standing training in order, to achieve the purpose of sitting up and standing up in the early stage of rehabilitation and strengthening core muscles, and avoid occurrence of complications due to long-term bedridden and abnormal recovery modes.

It may be understood that the degree of paralysis varies among patients. For a patient with a lower degree of paralysis, after the above first feedback device obtains the patient's core muscle strength parameters, the control device 5 can analyze and process the stronger parameters of the patient's muscle strength to provide the patient with a training mode (manner) with lower degree of assistance, and thus can effectively dynamically adjust posture training modes according to real-time status of the patient's core muscle strength parameters during rehabilitation training, thus adjusting the driving device 1 to achieve a posture training mode more suitable for the patient. For example, in a lying-sitting training during the early stage, the rehabilitation training equipment may be used to provide a stronger assistance to the patient, and in the sitting-standing training during the later stage, the assistance provided by the rehabilitation training equipment may be reduced and the patient's own strength may be used for training, so that the patient can recover quickly through the rehabilitation training. The above manner may enable the rehabilitation training equipment to provide targeted rehabilitation training plans for patients, instead of adopting the same posture training mode for users who have different core muscle strength parameters, thus avoiding problems of low training efficiency and long recovery periods for patients.

The driving device 1 of the disclosure adjusts the rotation angles between the back placement device 2, the cushion device 4, and the leg aid device 3, so that the rehabilitation training equipment can achieve training in a posture training mode selected from multiple posture training modes including the standing mode, the sitting-up mode and lying mode. Patients can complete a variety of posture training modes without help from outsiders, thereby saving labor costs and enriching the rehabilitation environment for patients. Moreover, the control device 5 of the rehabilitation training equipment disclosed in the present application can adjust the rehabilitation training equipment to enter into a posture training mode adapted to the patient's core muscle strength parameters according to the body' core muscle strength parameters acquired by the first feedback device, so that the rehabilitation training equipment can dynamically adjust the posture training mode according to different physical conditions of the patients, so as to quickly help the paralyzed patient to restore the core muscle strength and balance, and help shorten the patient's recovery cycle.

In some embodiments, the driving device 1 is further configured to adjust the rotation angle to realize the intermediate mode as the selected posture training mode. The above intermediate mode may be understood as a mode between standing mode and sitting-up mode, or a mode between sitting-up mode and lying mode, which provides patients with more posture training modes, so that patients can choose according to actual needs a more suitable posture training mode for rehabilitation.

It may be understood that when the rehabilitation training equipment is in the above intermediate mode, the posture of the patient may at least include an intermediate position that enables the patient to be placed in an intermediate position between sitting and standing or between lying and sitting. That is, the rotation angle between the back placement device 2 and the cushion device 4, and the rotation angle between the cushion device 4 and the leg aid device 3 are each adjustable, so as to provide the patient with enriched posture training modes, and to better meet different needs of the patients when the patient needs some targeted training.

In some embodiments, the driving device 1 is further configured to adjust the rotation angle to realize a process of transferring between at least two posture training modes.

Specifically, the process of transferring between at least two posture training modes may be understood as selecting at least two posture training modes for transferring therebetween from multiple posture training modes including standing mode, sitting-up mode, lying mode, and intermediate mode. For example, users may transfer between the standing mode and the sitting-up mode for training, or users may transfer between the standing mode, the sitting-up mode and the lying mode for training, so that the patient may choose a variety of posture training modes to customize a training plan to achieve the purpose of rapid recovery and efficient training.

In some embodiments, the control device 5 may be further configured to send a control signal to the driving device 1 indicating a lower degree of assistance in the posture training mode as the core muscle strength performance corresponding to the core muscle strength parameter is healthier.

It may be understood that the core muscle strength parameters may characterize the difficulty when transferring the patient's posture (such as lying-sitting-standing). When the patient has a milder degree of paralysis, the core muscle performance corresponding to the patient's core muscle strength parameters is healthier, and then there is no need for the driving device 1 to provide a higher degree of assistance to the patient, and the patient can complete the training by combining his own strength and the lower degree of assistance provided by the rehabilitation training equipment, achieving that the patient quickly recovers his body through rehabilitation training in combination with his own core muscle strength parameters. When the patient has a more severe degree of paralysis, the core muscle performance corresponding to the patient's core muscle strength parameters is less healthy, and then there is a need for the driving device 1 to provide a higher degree of assistance to the patient, and the patient can complete the training only with a higher degree of assistance provided by the rehabilitation training equipment. The above core muscle strength parameters vary with the patient during the rehabilitation process. Therefore, the control device 5 may obtain real-time core muscle strength parameters to quickly help the patient to train and recover according to the patient's real-time condition.

In some embodiments, the control device 5 may be further configured to be communicably connected to a user terminal to receive a user input from the user terminal.

It may be understood that the above user terminal may be a notebook computer, a smart phone or a user PC terminal. A doctor who makes a rehabilitation plan for the patient or the patient himself can input a required posture training mode on the user terminal, and the control device 5 receives control instructions input by the user on the user terminal and therefore controls the driving device 1 to adjust the rotation angles between the back placement device 2, the cushion device 4, and the leg aid device 3 according to the posture training mode under the set training plan.

Figure 5:
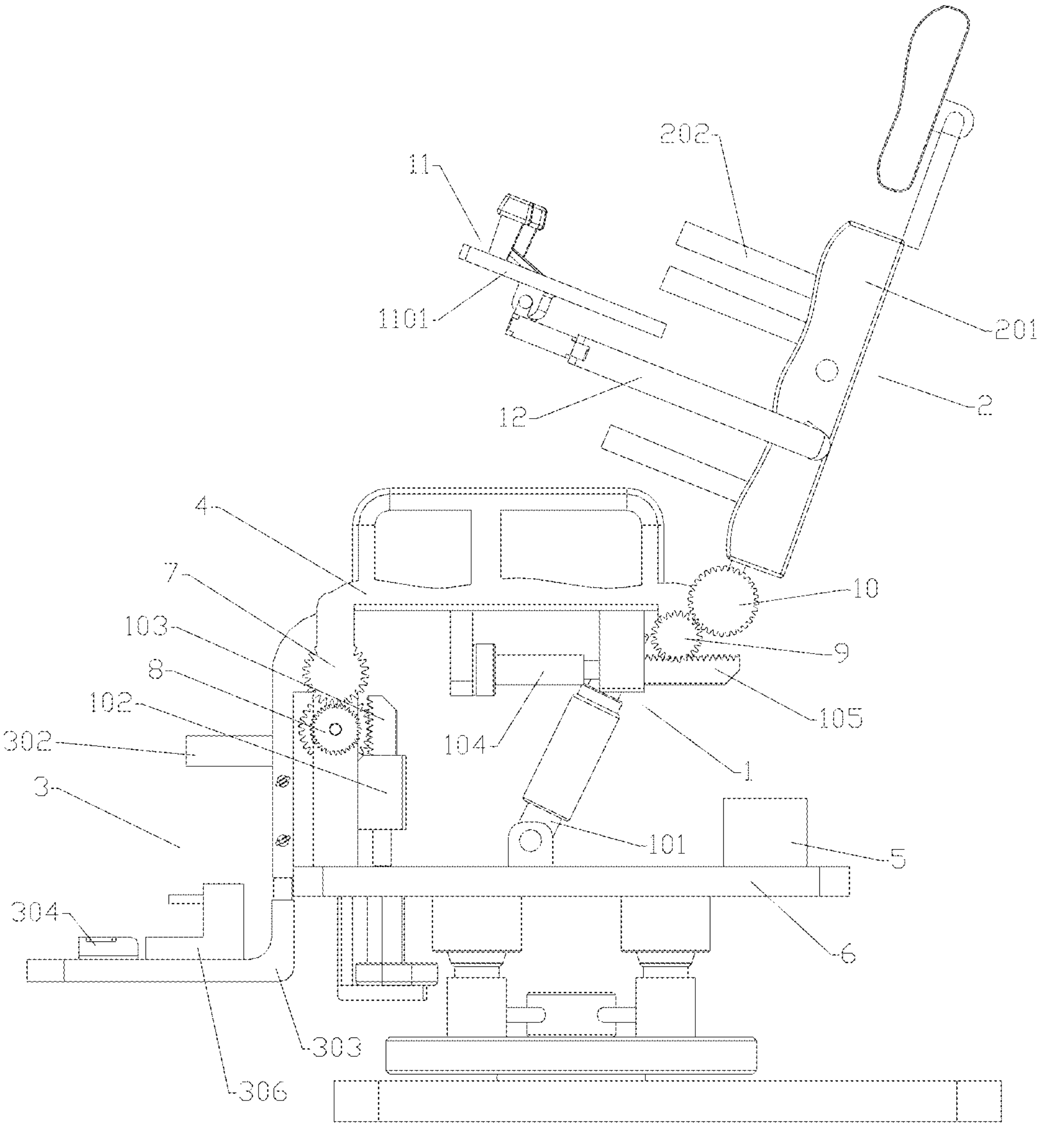
FIG. 5 is a schematic structural diagram of the rehabilitation training equipment according to the embodiment of the disclosure.
Figure 6:
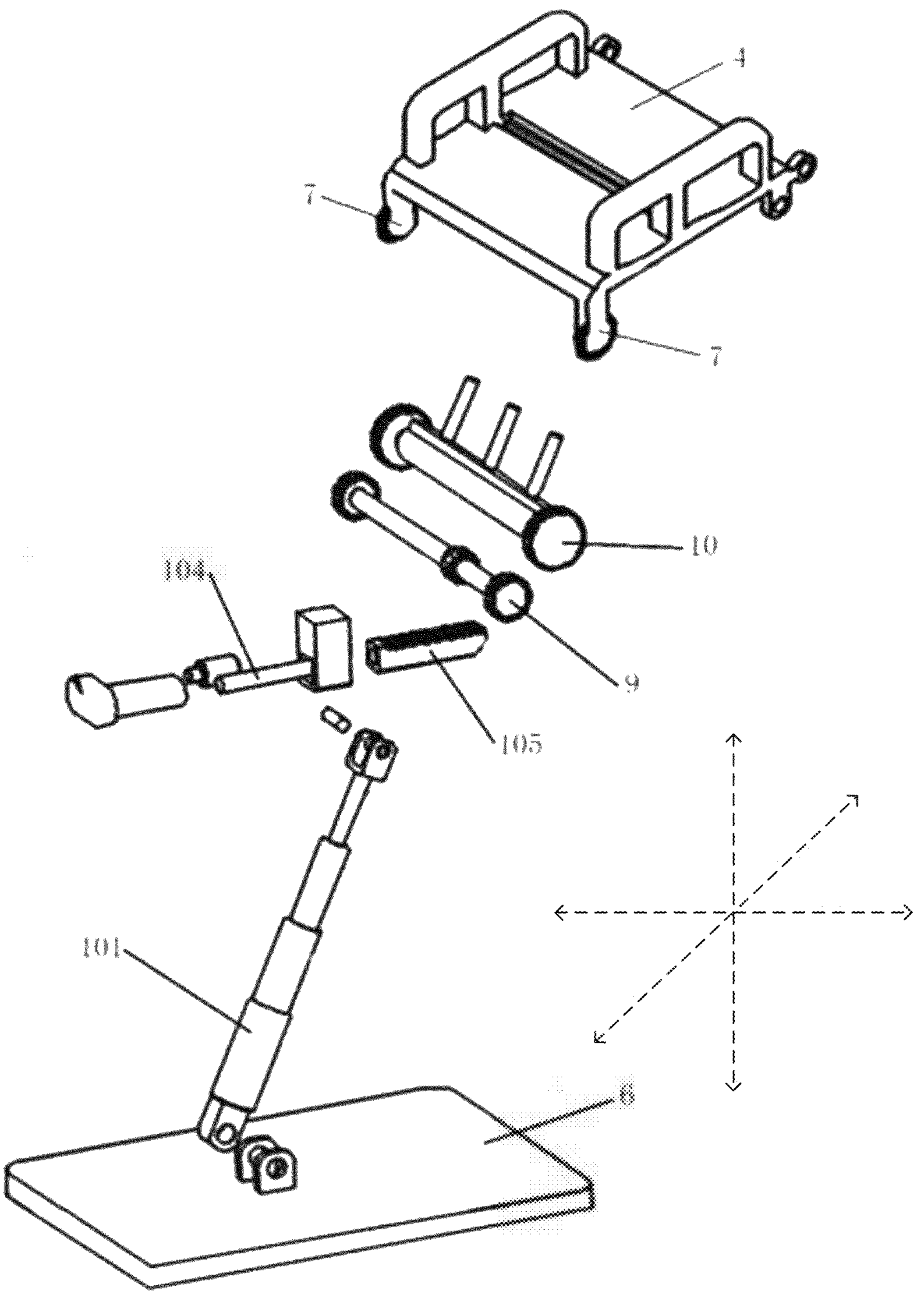
FIG. 6 is a first partial explosive view of the rehabilitation training equipment according to the embodiment of the disclosure.

In some embodiments, as shown in FIGS. 5 to 6, the rehabilitation training equipment further includes a supporting part 6, on a side of which the leg aid device 3 is fixed, and the driving device 1 includes a hydraulic assembly 101 provided on the supporting part 6, wherein the hydraulic assembly 101 is electrically connected with the control device 5, and is hinged with the cushion device 4 on one end thereof. The control device 5 is also used to control the hydraulic assembly 101 to lift or lower the cushion device 4.

It may be understood that the hydraulic assembly 101 is hingedly mounted on an upper surface of the supporting part 6 through a hinge at its lower end, and the hydraulic assembly 101 is hingedly mounted on a lower surface of the cushion device 4 at its upper end through a hinge, so that when the cushion device 4 rotates under the drive of the hydraulic assembly 101, the hydraulic assembly 101 can not only support the cushion device 4, but also buffer the rotation of the cushion device 4 when the cushion device 4 rotates, to make the rotation of the cushion device 4 more stable, so it is more convenient for patients to carry out rehabilitation training. The hydraulic assembly 101 may be a multi-stage hydraulic cylinder whose stroke should be sufficient to support the rotation of the cushion device 4 to an upright state.

Figure 7:
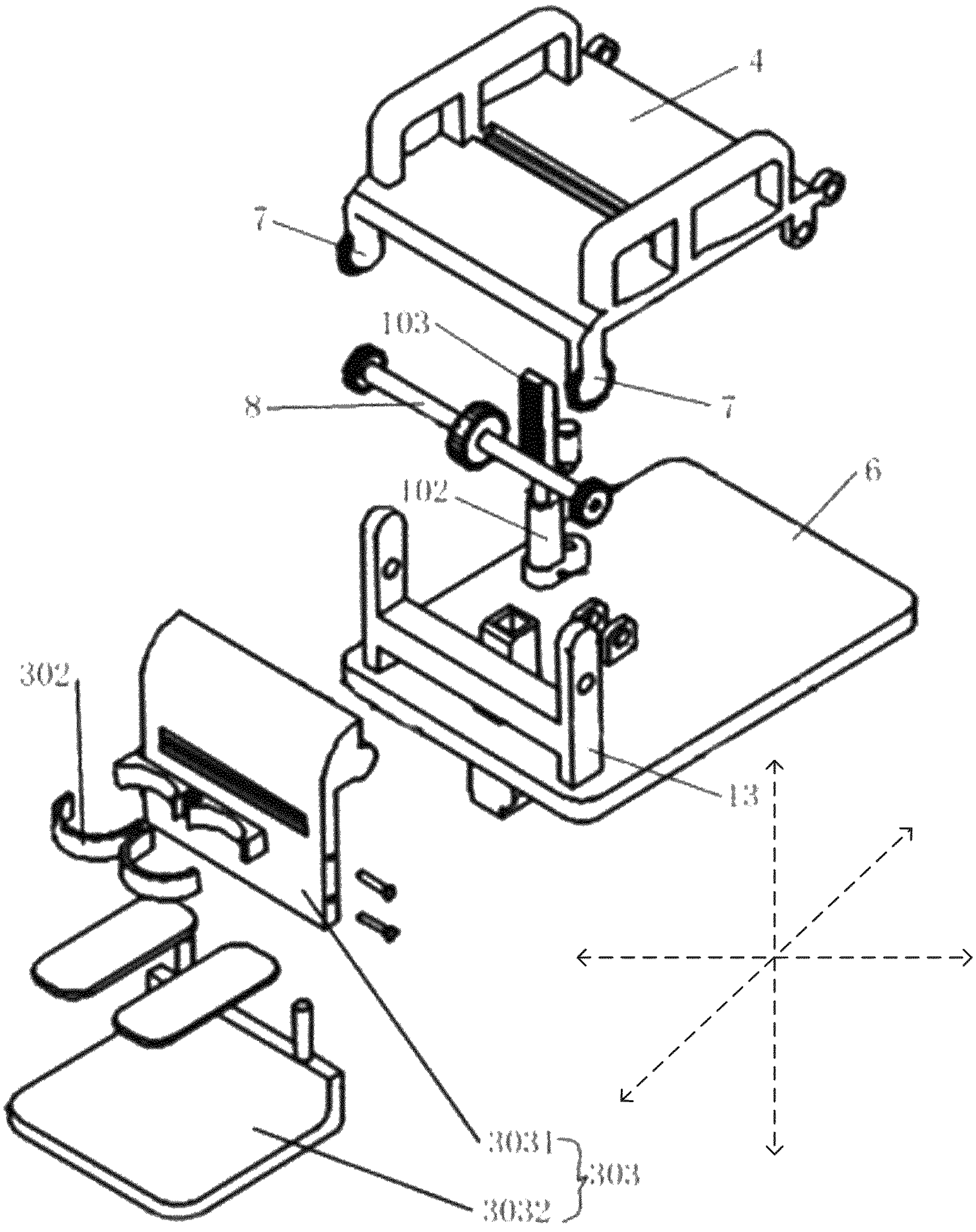
FIG. 7 is a second partial explosive view of the rehabilitation training equipment according to the embodiment of the disclosure.

In some embodiments, as shown in FIG. 7, the rehabilitation training equipment further includes a first gear assembly 7 and a second gear assembly 8, wherein the first gear assembly 7 is fixedly provided on the side of the cushion device 4 that is connected to the leg aid device 3, and the second gear assembly 8 is rotatablely provided on the supporting part 6 and is transmission-connected to the first gear assembly 7. The driving device 1 also includes a first motor 102 and a first output shaft 103 that is transmission-connected to the second gear assembly 8, so that the cushion device 4 rotates relative to the leg aid device 3 by bringing the second gear assembly 8 and the first gear assembly 7 to rotate through the first output shaft 103. The above first motor 102 may be a screw motor, and the above first output shaft 103 may be a screw shaft.

It may be understood that, as shown in FIG. 7, the first gear assembly 7 may include two first gears, the second gear assembly 8 may include two second gears respectively meshing with the two first gears and a first input gear for meshing with the first output shaft 103. Wherein, the above two second gears and the first input gear are each installed on the first mounting shaft. The first output shaft 103 can bring the first input gear to rotate when rotating so as to drive the first mounting shaft to bring the two second gears to rotate, so that the cushion device 4 rotates relative to the foot aid device. In addition, the supporting part 6 can be provided with a support frame 13 thereon, and both ends of the first mounting shaft can be placed on the supporting part 6 through the support frame 13.

In some embodiments, the rehabilitation training equipment further includes a third gear assembly 9 and a fourth gear assembly 10, wherein the third gear assembly 9 is rotatablely provided on the side of the cushion device 4 connected to the back placement device 2, and the fourth gear assembly 10 is fixedly provided on the cushion device 4 and is transmission-connected to the third gear assembly 9. The driving device 1 also includes a second motor 104 and a second output shaft 105 that is transmission-connected to the third gear assembly 9, so that the back placement device 2 rotates relative to the cushion device 4 by bringing the third gear assembly 9 and the fourth gear assembly 10 to rotate through the second output shaft 105. The above second motor 104 may be a screw motor capable of converting rotary motion into linear motion, and the above second output shaft 105 may be a screw shaft that can be transmission-connected to the third gear assembly 9.

It may be understood that, as shown in FIG. 6, the fourth gear assembly 10 may include two fourth gears which can be connected to each other through a second mounting shaft and are respectively provided at both ends of the second mounting shaft. And the third gear assembly 9 may include two third gears respectively meshing with the two fourth gears and a second input gear for meshing with the second output shaft 105. The above two third gears and the second input gear are both installed on the third mounting shaft. The second output shaft 105 can bring the second input gear to rotate when rotating so as to drive the third mounting shaft to bring the two third gears and the second mounting shaft to rotate, so that the back placement device 2 rotates relative to the cushion device 4.

It may be understood that the second motor 104 can be fixedly installed on the lower surface of the cushion device 4 by screws and can be connected to the second output shaft 105 by a coupling, and the axial direction of the second output shaft 105 is parallel to the horizontal direction.

In some embodiments, as shown in FIG. 5, the back placement device 2 includes a backrest 201 and a plurality of upper body fastening straps 202 elastically connected to the backrest 201 to fix the upper body of the human body and arranged at intervals along the length direction of the backrest 201. Wherein, the width of the upper part of the above backrest 201 should be greater than the width of the upper part of the patient's back, so as to be convenient for patients to place their shoulders during rehabilitation training.

It may be understood that, as shown in FIG. 5, the backrest 201 at its upper end can be fixedly mounted with a pillow and two frames for supporting the pillow. In order to be suitable for patients with different neck lengths, the frames may be in a telescopic structure, so as to facilitate the adjustment of the height of the pillow and make the patient more comfortable during rehabilitation training.

It may be understood that, as shown in FIG. 5, the cushion device 4 may include a cushion plate for bearing the patient's buttock, and the backrest 201 and the cushion plate may be equipped with the above plurality of upper body fixing straps 202 thereon. A plurality of upper body fixing straps 202 on the backrest 201 are arranged at intervals along the length of the backrest 201, and are respectively located at the upper and lower ends of the backrest 201. The upper body fixing straps 202 located at the upper end of the backrest 201 are mainly used to fix the chest of the patient, and the upper body fixing straps 202 located at the lower end of the backrest 201 are mainly used to fix the patient's waist. Through the cooperation of a plurality of upper body fixing straps 202, the upper body portion of the patient is fixed, thereby preventing the patient from getting injured facing downwards while standing during rehabilitation training.

Further, the upper body fixing straps 202 can also be provided on the cushion plate, and the upper body fixing straps 202 on the cushion plate are mainly used to fix the patient's thigh, therefore preventing the patient's thigh from sliding down due to lack of support when the patient is standing during rehabilitation training, and thus achieving the purpose of fixing the patient more firmly.

Further, in order to make the upper body portion of the patient better fit the backrest 201 after being fixed, and to facilitate the fixation of patients with different statures, one end of the upper body fixing strap 202 may be configured into an elastic structure, so that after the patient is fixed, the upper body fixing strap 202 can fit the patient's body, making the patient more comfortable when standing during rehabilitation training.

Further, the backrest 201 may be mounted with shoulder fixing straps (not shown in the figures) thereon, which may be two, The two backrests 201 may be arranged symmetrically with respect to the central axis of the backrest 201, and may be elastic to better fix the shoulders of the patient. With the above two shoulder fixing straps together fixing the patient's shoulders, the patient's upper limbs are more stable when the patient stands during rehabilitation training, which not only prevents the patient from sliding down due to gravity when standing, but also makes the patient's upper body portion fit better with the backrest 201 when the patient stands during rehabilitation training, making the patient more stable during rehabilitation training when standing.

Figure 8:
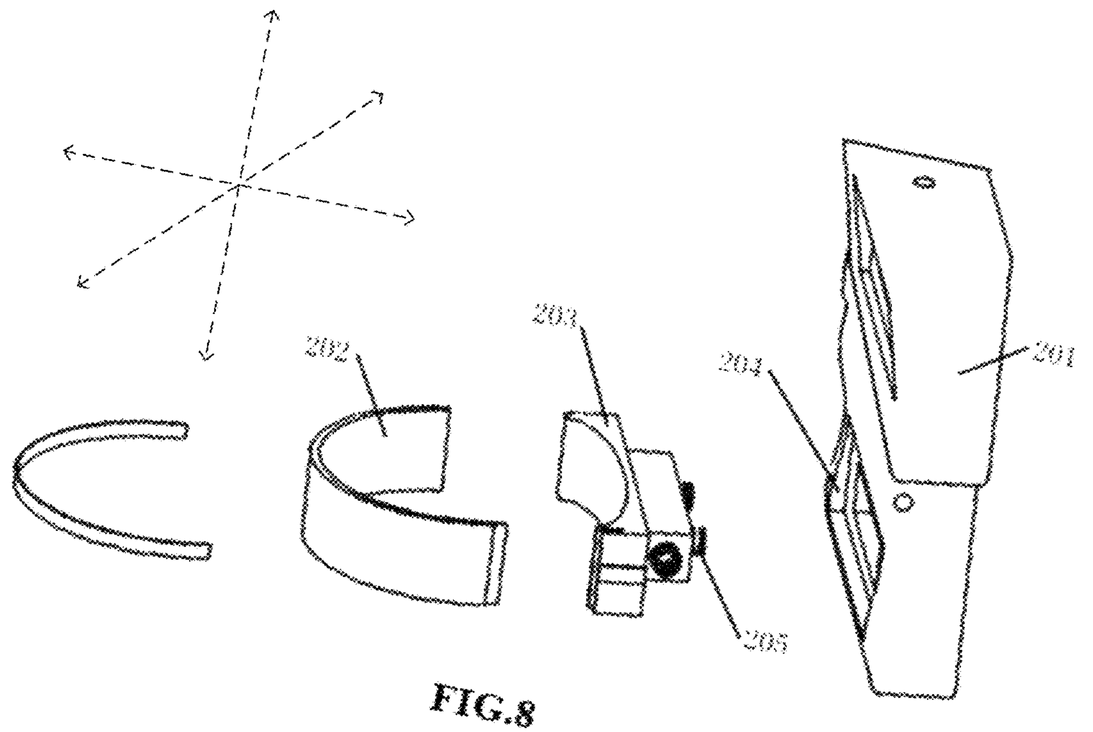
FIG. 8 is a third partial explosive view of the rehabilitation training equipment according to the embodiment of the disclosure.

In some embodiments, as shown in FIG. 8, the back placement device 2 further includes a plurality of movable mounting bases 203 for installing the upper body fixing straps 202 and provided corresponding to the upper body fixing straps 202. The backrest 201 is opened with a plurality of mounting grooves 204 corresponding to the plurality of movable mounting bases 203, and each mounting groove 204 is provided with an elastic member 205 therein connected to the corresponding movable mounting base 203.

It may be understood that, as shown in FIG. 8, the upper body fixing strap 202 is installed on the movable mounting base 203, an elastic member 205 is installed between the movable mounting base 203 and the bottom of the mounting groove 204, the width of the opening of the mounting groove 204 is smaller than the width of the bottom of the mounting groove 204, and the movable mounting base 203 is matched with the mounting groove 204.

Further, when there are multiple upper body fixing straps 202 on the backrest 201, the movable mounting bases 203 have the number and positions each corresponding to the number and positions of the upper body fixing straps 202 on the backrest 201 in a one-to-one manner. The mounting groove 204 is opened in the seating surface of the backrest 201, and by setting the width of the opening of the mounting groove 204 to be smaller than the width of the bottom of the mounting groove 204, the movable mounting base 203 will not escape from inside the mounting groove 204 after being installed in the mounting groove 204.

Further, by installing the elastic member 205 between the movable mounting base 203 and the bottom of the mounting groove 204, the movable mounting base 203 can have a certain degree of mobility in the mounting groove 204, which enables the patient's balance ability to be trained and the patient's rehabilitation training effect to be better when the patient is undergoing rehabilitation training.

Figure 9:
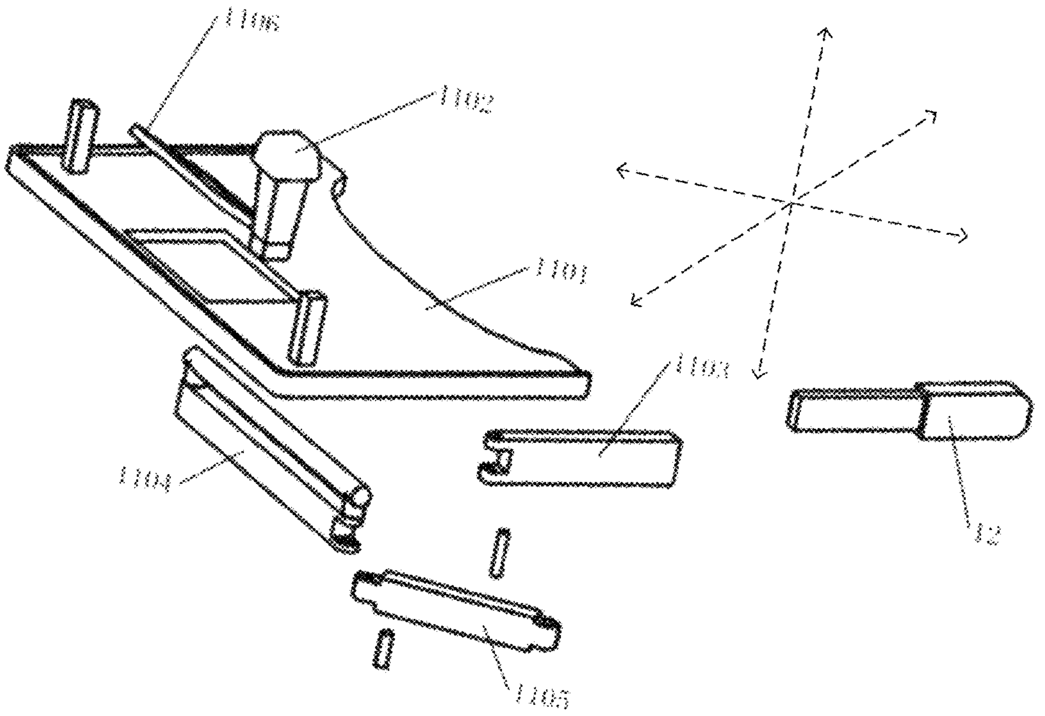
FIG. 9 is an explosive view of the desk assembly of the rehabilitation training equipment according to the embodiment of the disclosure.

In some embodiments, as shown in FIGS. 5 and 9, the rehabilitation training equipment further includes a desk assembly 11 arranged in front of the backrest 201 and telescopic brackets 12 respectively arranged on opposite two sides of the backrest 201. The desk assembly 11 includes a desk board 1101 pivotally connected to two telescopic brackets 12 and an operation handle 1102 arranged on the desk board 1101. The operation handle 1102 is electrically connected to the control device 5 to send an operation signal to the control device 5 for controlling the posture training modes of the rehabilitation training equipment.

It may be understood that the desk board 1101 has an arc structure at a side close to the patient, so that the desk board 1101 fits the patient's body more conveniently, making the patient more comfortable during rehabilitation training. And a control panel 1106 may be placed on the desk board 1101, and is electrically connected to the operation handle 1102, which enables the patient to view the content of the display screen on the control panel 1106 through the control panel 1106 during rehabilitation training. The operation handle 1102 can send instruction signals to the control device 5 for controlling the modes of rehabilitation training equipment. In this manner, the patients may choose different rehabilitation modes according to their own physical conditions during rehabilitation training, thereby increasing the patient's rehabilitation pleasure. In addition, in order to prevent the operation handle 1102 from slipping when being held, the outer surface of the operation handle 1102 may be provided with anti-slip texture.

It may be understood that the telescopic bracket 12 at one end thereof can be mounted with a long arm support 1103 which is hinged to the transition support 1105, and the desk board 1101 at the lower surface thereof can be mounted with a desk support 1104 which can be hinged to the transition support 1105. The telescopic bracket 12 at the other end thereof can be hinged on the backrest 201, so that the telescopic bracket 12 can be rotated on the backrest 201. The hinged connection between the telescopic bracket 12 and the long arm support 1103, the hinged connection between the long arm support 1103 and the transition support 1105, as well as the hinged connection between the transition support 1105 and the desk support 1104, are each connected by friction hinges, which not only facilitates people to rotate the desk board 1101 at will, but also makes the desk board 1101 not rotate arbitrarily after the position of the desk board 1101 is adjusted, thus stably placing the desk board 1101. The desk support 1104 is a fixing shaft fixedly supported on the lower surface of the desk board 1101, and the transition support 1105 is frictionally hinged with the fixing shaft, so that installation of the desk board 1101 is more stable.

It may be understood that armrests can be installed on both sides of the cushion plate, and can be detachably installed with the cushion plate, and is convenient for the patient to hold during rehabilitation training. In addition, in order to facilitate the patient to hold the armrests tightly during rehabilitation training, anti-slip threads can be provided on the armrests to prevent the patient from sweating and slipping of the armrests.

Figure 10:
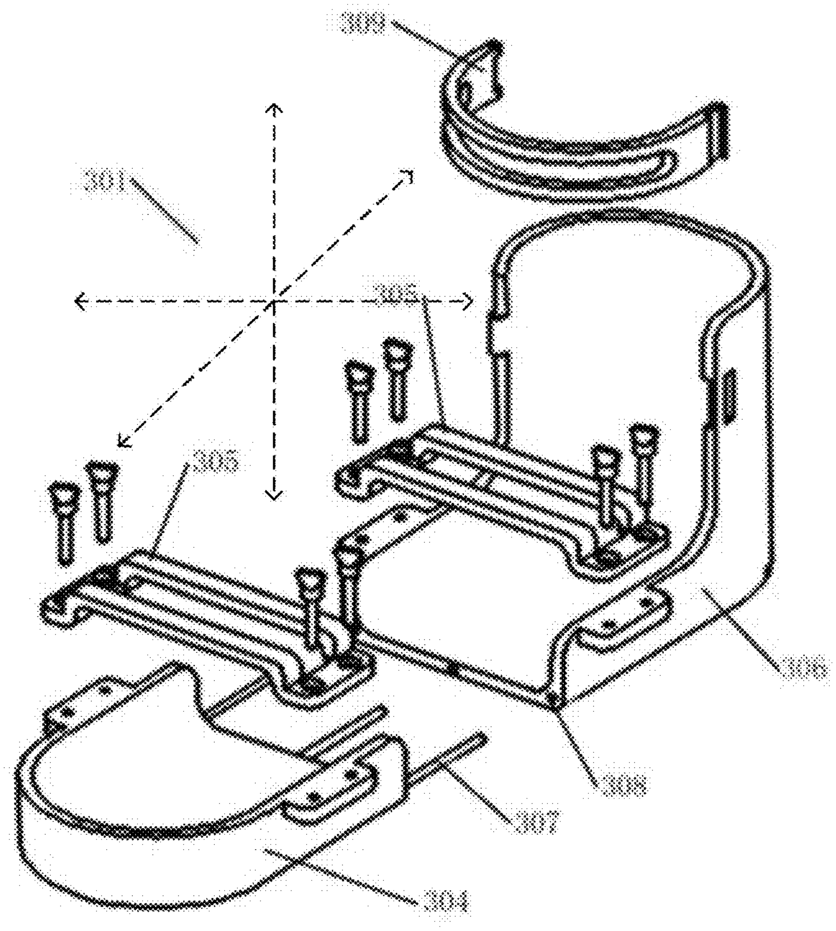
FIG. 10 is a partial explosive view of leg aid device of the rehabilitation training equipment according to the embodiment of the disclosure.

In some embodiments, as shown in FIG. 10, the leg aid device 3 includes a leg support assembly 301 and a lower body fixing strap 302 elastically connected to the leg support assembly 301 to fix the lower body of the human body. The leg support assembly 301 includes a leg support plate 303, a toe cover 304 corresponding to toes of a human body, a plurality of fixing plates 305 corresponding to an instep of the human body, and a heel sleeve 306 corresponding to heels of the human body. The heel sleeve 306 is connected to the leg support 303, and may have an L-shaped shape, and its height in the vertical direction may extend to a position corresponding to the patient's ankle joint. The plurality of fixing plates 305 are detachably provided on the heel sleeve 306 and the toe cover 304 respectively.

It may be understood that the above lower body fixing strap 302 is used to fix the lower leg of the patient and is detachably installed on the leg support assembly 301. The heel sleeve 306 is used to fix the heel of the patient, and the toe cover 304 is used to fix the toes of the patient. When the patient is undergoing rehabilitation training, the patient's feet may be directly worn in the toe cover 304 and the heel sleeve 306 and the patient's lower leg are fixed to the leg support assembly 301 by the lower body fixing strap 302, so as to effectively fix the patient's lower body. The above structure can achieve a better fixing effect, and is beneficial to training the patient's foot strength.

It may be understood that, in conjunction with FIG. 10, the number of the above fixing plates 305 corresponding to a single foot may be two, and the two fixing plates 305 are arranged in sequence along the length direction of the instep of the patient. The above leg aid device 3 may further include a fixing sleeve 309 provided on the leg support plate 303 and corresponding to the ankle joint of the patient. Through the cooperation between the fixing sleeve 309 and the fixing plate 305, a better fixing effect on the patient's foot is achieved.

Further, in order to facilitate the installation of the fixing plate 305, outwardly turned bosses can be provided at the upper edges of the toe cover 304 and the heel sleeve 306, and connecting parts corresponding to the bosses are provided on the fixing plates 305. Corresponding through holes can be respectively provided in the bosses and the connecting parts. When the fixing plates 305 are installed, they can be stably installed on the toe sleeve 304 and the heel sleeve 306 with pins passing through the two through holes. The above structure is convenient for disassembly and assembly, and is convenient for the patient to use.

Further, in order to facilitate the fixation of the patient, the upper body fixing strap 202, the shoulder fixing strap and the fixing sleeve 309 can all be set into a belt structure, that is, one end is fixedly installed and the other end is fastened by fastening the casing with a button, which is not only convenient for the patient to be fixed, but also is convenient for the patient to be separated from the leg support plate 303, the cushion plate and the backrest 201 after the rehabilitation training is completed. In addition, the width of the upper body fixing strap 202 on the backrest 201 is not less than 20 cm, the width of the upper body fixing strap 202 on the cushion plate is not less than 10 cm, and the width of the shoulder fixing strap is not less than 10 cm.

In some embodiments, as shown in FIG. 10, the toe sleeve 304 has plugging shafts 307 extending towards the direction of the heel sleeve 306, and sockets 308 corresponding to the plugging shafts 307 are opened on the heel sleeve 306, and the outer wall of the heel sleeve 306 is provided with locking grooves (not shown in the figures) communicating with the sockets 308, and locking members (not shown in the figures) are installed in the locking grooves to make the plug shafts 307 abut against the sockets 308. The leg support plate 303 includes a vertical plate 3031 and a lateral plate 3032 (as shown in FIG. 7) that are arranged up and down and can be relatively close to or away from each other, wherein the vertical plate 3031 is fixedly connected to the supporting part 6, and the lateral plate 3032 is used to support the toe cover 304 and the heel sleeve 306.

It may be understood that, as shown in FIGS. 7 and 10, the above leg support plate is L-shaped, and specifically, includes a vertical plate 3031 that is arranged vertically and a lateral plate 3032 that is placed horizontally. The lower body fixing strap 302 is installed on the vertical plate 3031, the toe sleeve 304 and the heel sleeve 306 are provided on the above lateral plate 3032, and the fixing sleeve 309 can be provided on the vertical plate 3031. The above vertical plate 3031 can be fixedly installed on the supporting part 6, and is provided with a connecting slot on the lower side of the fixing portion, the lateral plate 3032 can be provided with a lateral plate 3032 connecting shaft on the upper side thereof capable of plugging into the connecting slot, and the above lateral plate 3032 and the vertical plate 3031 can be fixed with the connecting slot and the connecting shaft. The above structure makes it possible to adjust the distance between the lateral plate 3032 and the vertical plate 3031, which allows the patient to adjust the distance between the lateral plate 3032 and the vertical plate 3031 according to the length of their legs during rehabilitation training and have a better experience both in the sitting-up mode and in the standing mode, brings about a better fixation effect on the patient's lower leg, and avoids knees of the patient from injury during rehabilitation training.

Further, the above connecting grooves and the lateral plate 3032 connecting shafts are arranged in one-to-one correspondence, and the number of connecting grooves and that of the lateral plate 3032 connecting shafts may be multiple. The multiple connecting grooves are arranged at intervals along the width direction of the vertical plate 3031.

Preferably, the number of the connecting grooves and that of the lateral plate 3032 connecting shafts may both be two.

Further, locking screws can be respectively provided on two opposite sides of the vertical plate 3031 along its width direction, and the locking screws are inserted into the vertical plate 3031 and abut towards the connecting shafts so as to abut the connecting shafts in the connecting grooves. Thus, the vertical plate 3031 and the lateral plate 3032 can maintain a stable relative position relationship.

It may be understood that sockets 308 are provided on a side of the heel sleeve 306 facing the toe sleeve 304, and the plugging shafts 307 are provided on a side of the toe sleeve 304 facing this side. The above locking members can act on the plugging shafts by passing through the locking grooves. When the distance between the heel sleeve 306 and the toe sleeve 304 is adapted to the size of the patient's sole, the plugging shafts 307 can be abut tightly in the sockets 308 by the locking members, which maintain the relative position relationship between the heel sleeve 306 and the toe cover 304.

Further, the sockets 308 and the plugging shafts 307 are arranged in a one-to-one correspondence, and the number of sockets 308 and that of plugging shafts 307 may be multiple, and a plurality of plugging holes are arranged at intervals along the width direction of the heel sleeve 306. Preferably, as shown in FIG. 10, the number of the above sockets 308 and that of the plugging shafts 307 may both be two.

The above toe sleeve 304 can be relatively close to or far away from the heel sleeve 306 through the cooperation of the plugging shafts 307 and the sockets 308, so as to adapt to the foot sizes of different patients, which causes the toe sleeve 304 and the heel sleeve 306 to be adapted to patients with different foot sizes, and prevent the patient's ankle from being injured due to instability of the patient's foot during standing rehabilitation training. In some embodiments, the first feedback device includes a pressure sensor and/or a torque sensor (not shown in the figures).

It may be understood that the above pressure sensor and/or torque sensor can be arranged on one or more of the back placement device 2, the leg aid device 3 or the cushion device 4, and are electrically connected to the control device 5, so the control device 5 receives pressure information related to the patient's core muscle strength parameters from the pressure sensor and/or the torque sensor and analyzes the pressure information. Based on the results of the analysis, it is possible to provide patients with a posture training mode that is more suitable for their physical conditions, which is conducive to recovery of the patients.

With the rehabilitation training equipment of the embodiment of the present disclosure, as shown in FIGS. 4 and 5, when the patient needs rehabilitation training, he first sits on the cushion device 4, then puts his feet into the toe cover 304 and the heel sleeve 306, then adjusts the distance between the toe cover 304 and the heel sleeve 306 to make it adapted to the size of the foot. When the toe cover 304 and the heel sleeve 306 are adjusted to a proper position, by twisting the locking members, the toe cover 304 and the heel sleeve 306 are locked and fixed, and finally, the patient's feet are fixed by the fixing plate 305 and the fixing sleeve 309 on the heel sleeve 306 and the toe sleeve 304.

Further, the height of the leg support plate 303 is adjusted according to the length of the patient's lower leg. Specifically, loosening the locking screws to make the connecting shafts lose locking force. At this time, moving the vertical plate 3031 and the lateral plate 3032 of the leg support plate 303 according to the length of the patient's lower leg so as to adjust the distance between the vertical plate 3031 and the lateral plate 3032. When the distance between the vertical plate 3031 and the lateral plate 3032 matches the length of the patient's lower leg, tightening the locking screws to lock and fix the connecting shafts, and then fixing the patient's lower leg by the fixing sleeve 309 on the vertical plate 3031 of the leg supporting plate 303.

Next, fixing the patient's thigh by the upper body fixing strap 202 on the cushion plate, fixing the patient's waist by the upper body fixing strap 202 on the lower end of the backrest 201, fixing the patient's chest by the upper body fixing strap 202 on the upper end of the backrest 201, and fixing the patient's shoulders by the two shoulder fixing straps. In this manner, the patient is fixed on the rehabilitation training equipment.

After the patient is fixed on the rehabilitation training equipment, the height of the pillow can be adjusted according to the height of the patient's head. Specifically, the height of the pillow can be adjusted by adjusting the frame, so that the patient's head can be supported.

When the patient needs to adopt the lying mode for rehabilitation training, the second motor 104 rotates forward and brings the second output shaft 105 to rotate, and then the second output shaft 105 brings the third gear assembly 9 to rotate and thus brings the fourth gear assembly 10 to rotate, so that the backrest 201 rotates synchronously with the fourth gear assembly 10. And when the backrest 201 rotates to be level with the cushion plate, the patient can lie flat on the cushion plate and the backrest 201 (as shown in FIGS. 1 and 4).

When the patient needs to adopt the sitting-up mode for rehabilitation training, the second motor 104 rotates reversely and brings the second output shaft 105 to rotate, and then the second output shaft 105 brings the third gear assembly 9 to rotate and thus brings the fourth gear assembly 10 to rotate, so that the backrest 201 rotates synchronously with the fourth gear assembly 10. And when the backrest 201 rotates to be perpendicular to the cushion plate, the patient can sit upright on the rehabilitation training equipment (as shown in FIGS. 2 and 4). When the patient adopts the sitting-up mode for rehabilitation training, the backrest 201 can maintain a certain tilt angle with the cushion plate, that is, the rehabilitation training equipment is in an intermediate mode between the lying mode and the sitting-up mode.

When the patient needs to adopt the standing mode for rehabilitation training, first turning the backrest 201 to a vertical state. Specifically, the second motor 104 rotates reversely, thereby rotating and bringing the second output shaft 105 to rotate, and then the second output shaft 105 brings the third gear assembly 9 rotates and thus brings the fourth gear assembly 10 to rotate, so that the backrest 201 rotates synchronously with the fourth gear assembly 10. And when the backrest 201 rotates to be perpendicular to the cushion plate, the patient sits upright on the rehabilitation training equipment (as shown in FIG. 2 and FIG. 4). Next, the cushion plate is rotated to the vertical state, the first motor 102 rotates reversely, thereby rotating and bringing the first output shaft 103 to rotate. By means of meshing between the first output shaft 103 and the second gear assembly 8, the first gear assembly 7 may be brought to rotate, so that the cushion plate rotates synchronously with the first gear assembly 7. While the second motor 104 rotates, the hydraulic assembly 101 works synchronously, so that the hydraulic assembly 101 can synchronously support the cushion plate when the cushion plate rotates. When the cushion plate is rotated to the vertical position, the vertical plate 3031 of the leg support plate 303, the cushion plate and the backrest 201 are located on the same vertical line, so that the patient is in a standing state (as shown in FIG. 3 and FIG. 4).

During the rehabilitation of the patient, the patient or the rehabilitation trainer can adjust the telescopic bracket 12, the long arm support 1103, and the transition support 1105 to make the control panel 1106 correspond to the patient; at the same time, when the patient needs to change the posture during the rehabilitation, the patient or the rehabilitation trainer can select the adjusted posture, posture training mode, training game or watch video on the control panel 1106 by manipulating the operation handle 1102, thereby enhancing the interest of the patient in the balance training process.

When the patient needs to perform "lying-sitting" training, that is, when transferring between the lying mode and the sitting-up mode, the backrest 201 is rotated by the forward or reverse rotation of the second motor 104, thereby making the backrest 201 be parallel or perpendicular to the cushion board. When the patient needs to perform "sitting-standing" training, that is, when transferring between the sitting-up mode and the standing mode, the backrest 201 is rotated or the backrest 201 and the cushion board are rotated with respect to each other by adjusting the second motor 104 or the first motor 102 and the hydraulic assembly 101, so that the cushion plate and the backrest 201 are relatively rotated to transfer between the sitting mode and the standing mode for training.

According to the core muscle balance rehabilitation training concept and ergonomic characteristics, the present disclosure helps the patient restore core muscle strength and balance by controlling the key points of the patient's body; at the same time, through the sequential training of the "lying-sitting-standing" posture transfer, the "lying-sitting" posture transfer, the "sitting-standing" posture transfer, the intermediate posture between the "lying-sitting" postures, or the intermediate posture between the "sitting-standing" postures, it can assist the patient in the posture shift, avoid bedridden complications, and achieve the purpose of early sitting up and standing and early recovery of patients.

During the training process, according to the patients' recovery, "lying-sitting" training may be performed at the early stage and "sitting-standing" training may be performed at the later stage. At the same time, according to the operation conditions of the first motor 102 and the second motor 104, the training intensity of the patient may be adjusted. Besides, according to the patients' core muscle strength parameters, the patient may complete the training step by step with the assistance of the trainer.

In the training process of the present disclosure, due to the diversification of posture training modes, the training is more interesting and patient compliance is improved. At the same time, when the patient is fixed, the fixing sleeve 309, the fixing plate 305, the upper body fixing strap 202, and the lower body fixing trap and shoulder fixing strap cooperate to fix the patient, which not only improves the comfort and safety of the patient during rehabilitation training process, but also helps the patient to introduce the correct posture and reflection.

Figure 11:
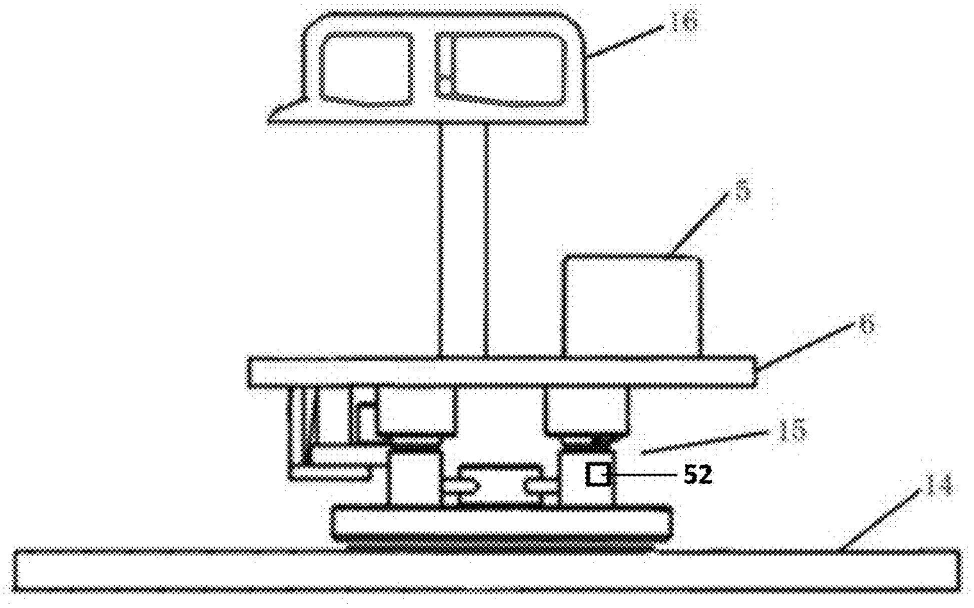
FIG. 11 is a schematic structural diagram of the rehabilitation training equipment according to the embodiment of the disclosure.

According to some embodiments of the present disclosure, another rehabilitation training equipment is provided. As shown in FIG. 11, the rehabilitation training equipment includes a base 14, a supporting platform, a disturbance mechanism 15, and a control device. The control device may be the same control device as the control device 5 in the foregoing embodiments of the present disclosure, or may be a different control device, which is not specifically limited in this application. The following two control devices are the same control device as an example for description. The supporting platform is arranged above the base 14 and is used to support an object (that is, a patient) for rehabilitation training. In FIG. 11, a supporting platform including a supporting part 6 (such as a supporting plate) and an object bearing part 16 connected thereto is taken as an example, and the supporting platform of this structure is taken as an example in the following various embodiments to describe the structure of the rehabilitation training equipment, but the present disclosure is not limited to this. The object bearing part 16 may also be integrated in the supporting platform. In some embodiments, a portion of the object bearing part 16 can also be used as the supporting part 6, which will not be repeated here. The disturbance mechanism 15 is adapted to the base 14 and the supporting platform. The control device 5 may be configured to control the disturbance mechanism 15 as required to push the supporting platform to perform motion at least including tilt motion relative to the base 14, so as to provide at least tilt disturbance for specific rehabilitation training requirements, which may be static disturbance, dynamic disturbance, regular disturbance, or random disturbance.

FIG. 11 shows an exemplary structure of the disturbance mechanism 15—multiple pushing parts cooperate to form an inclination, and the disturbance mechanism 15 in this structure is also taken as an example in the various embodiments below. However, the disturbance mechanism 15 may also adopt other structures to form the inclination, such as but not limited to a pivoting method or a gear transmission method to form the inclination, which will not be repeated here.

In some embodiments, the control device is configured to: control the disturbance mechanism 15 to push the supporting platform to perform motions at least including tilting and rotation motions relative to the base 14. Wherein, the supporting platform includes a supporting part 6 and an object bearing part 16 connected to it. The supporting part 6 is supported on the base 14 via a disturbance mechanism 15 and connected to the object bearing part 16, so that the object bearing part 16 follows the supporting part 6 to move. The disturbance mechanism 15 is adapted to the base 14 and the supporting part 6, and is configured to push the supporting part 6 under the control of the control device 5 to perform motions including at least both tilting and rotation motions relative to the base 14. The control device 5 is further configured to control the disturbance mechanism 15 to push the supporting part 6. By providing the object bearing part 16 with motions including at least both the tilt motion and the rotation motion, through the cooperation of the tilt motion and the rotation motion, the tilting disturbance at any tilt angle at any circumferential angle can be realized, thereby providing the patients with abundant tilt disturbance experience, and can carry out more comprehensive and thoughtful rehabilitation training for core muscle groups.

It may be understood that, as shown in FIG. 11, the above object bearing part 16 is provided on the supporting part 6, and can provide support for the patient in any posture, so as to perform targeted training on the patient's body according to actual rehabilitation training needs, especially to provide support for patients in lying posture, sitting-up posture and standing position, which enables the patient to transfer between the lying mode, the sitting-up mode, and the standing mode on the object bearing part 16 for training.

It may be understood that the above object bearing part 16 is connected to the supporting part 6, so that the object bearing part 16 is stably placed on the supporting part 6, and when the supporting part 6 rotates or tilts, the object bearing part 16 can follow the supporting part 6 to move, so that the patient on the object bearing part 16 can adjust through its own body balance function when the supporting part 6 is tilted or rotated, so as to achieve the purpose of balance training.

It may be understood that, continuing to combine with FIG. 11, the above disturbance mechanism 15 is disposed between the base 14 and the supporting part 6, and the base 14 can be stably placed on the ground for placing rehabilitation training equipment. The control device 5 can be provided on the supporting part 6 or on the base 14, and the control device 5 shown in FIG. 11 is provided on the supporting part 6 and can control the disturbance mechanism 15 to push the supporting part 6 relative to the base 14 to perform at least tilting and rotating motions. The above disturbance mechanism 15 may include a mechanism capable of linear motion under the control of the control device 5, such as a hydraulic cylinder, a screw stepper motor, etc., as well as a mounting base 1503 for mounting a mechanism for linear motion. The base 1503 can be used to realize rotating motion.

It should be noted that the above control device 5 can control the disturbance mechanism 15 to make the rehabilitation training equipment enter the balance training mode. In this balance training mode, the patient can enter the tilt mode corresponding to the tilt motion, or the rotation mode corresponding to the rotation motion, or enter the composite mode corresponding to the tilt motion and the rotation motion at the same time. The above mode can be dynamically selected according to the patient's physical condition. The above rehabilitation training equipment can realize a variety of different training modes through the control of the disturbance mechanism 15 by the control device 5, so as to enrich the training manners of the patient.

It may be understood that when the supporting part 6 is tilted, the supporting part 6 may be tilted to make the angle between the supporting part 6 and the base 14 be any desired angle, which may be understood as the angle between the plane where the platform is located and the plane where the base 14 is located. When the supporting part 6 performs a rotation motion, it can rotate at any angle relative to the horizontal plane. Through the above structure, it is possible to perform tilting disturbance while performing rotating disturbance, so as to train the patient's balance function in various aspects and angles.

It may be understood that the above disturbance mechanism 15 may also make the supporting part 6 move up and down relative to the base 14 under the control of the control device 5. That is to say, on the basis of realizing the above rotation motion and tilt motion, the supporting part 6 can also move up and down in the direction perpendicular to the horizontal plane relative to the base 14, to combine the sudden lifting and lowering disturbances with tilting disturbances and/or rotation disturbances, so as to further train the patient's balance function and provide the patient with enriched training manners.

The disturbance mechanism proposed in the present disclosure may push the supporting part 6 to make tilti and rotation motions relative to the base 14, which cancels the current need to impose external force interference on the patient by therapist manually performs sudden pushing or shaking, etc., so that the patient does not depend on outsiders to complete the balance training. It saves labor costs and helps shorten the training cycle of the patient's balance function. In addition, the above disturbance mechanism can simultaneously apply balance training modes related to tilt disturbance and rotation disturbance to the patient, which provides enriched rehabilitation training environments for the patient.

In some embodiments, the control device 5 is further configured to control the disturbance mechanism 15 to push the supporting platform with motion parameters, which may include at least tilt parameters, such as each tilt angle of the tilt motion to be performed, the duration of maintaining each tilt angle, and transfer frequency of each tilt angle.

It may be understood that when the disturbance mechanism 15 pushes the supporting platform to perform a tilt motion, the disturbance mechanism 15 is controlled by the control device 5 for its motion parameters, and the above motion parameters have a corresponding relationship with the actual physical condition of the patient. Specifically, when the patient's body is relatively healthy, a larger tilt angle, a longer duration for maintaining the tilt angle, and a larger transferring frequency may be set, and the above transferring frequency is the transferring frequency between different tilt angles. When the patient's body is relatively unhealthy, a smaller tilt angle, a shorter duration for maintaining the tilt angle, and a smaller transferring frequency may be set, so as to adapt the motion parameters to the physical conditions of different patients, and enable the patient to perform the balance function training step by step on the rehabilitation training equipment. Wherein, the physical indicators related to the patient's physical condition can be input by a professional therapist, and after therapist inputs the corresponding data, the control device 5 may provide therapist with motion parameters adapted to the data, which is convenient for therapist to use and operate.

In some embodiments, the motion parameter may further include a rotation angle corresponding to each tilt angle. That is, the tilt angle of the supporting part 6 under the tilt disturbance and the rotation angle of the supporting part 6 under the rotation disturbance have a corresponding relationship. As an example, when the control device 5 controls the supporting part 6 to tilt at a first tilt angle, meanwhile it also controls the supporting part 6 to rotate at a first rotation angle corresponding to the first tilt angle. When the control device 5 controls the supporting part 6 to tilt at a second tilt angle, meanwhile it also controls the supporting part 6 to rotate at a second rotation angle corresponding to the second tilt angle. The above first tilt angle, second tilt angle, first rotation angle, and second rotation angle are not specifically limited in value by the present application, as long as it may provide patients with more targeted training manners through the correspondence between the tilt angle and the rotation angle.

It may be understood that a user can first adjust the rotation angle and then the tilt angle, or first adjust the tilt angle and then adjust the rotation angle. When the rotation angle is adjusted first and then the tilt angle, the tilt angle can be adjusted to any angle and then be fixed or fluctuate within a certain range after the supporting part 6 is rotated at a certain rotation angle. When the tilt angle is adjusted first and then the rotation angle, the supporting part 6 can be adjusted to rotate at a certain rotation angle after the supporting part 6 is tilted at any fixed tilt angle or after the tilt angle is adjusted to fluctuate within a certain range. The above adjustment manners can correspond to different balance training modes and are not specifically limited in this application.

In some embodiments, the control device 5 is further configured to: provide several balance training modes, so that each balance training mode has a corresponding set of motion parameters; based on the selected balance training mode, control the disturbance mechanism 15 to push the supporting platform with a corresponding set of motion parameters.

It may be understood that the control device 5 may control the disturbance mechanism 15 to push the supporting platform to move to achieve several balance training modes, such as a low-difficulty balance training mode, a medium-difficulty balance training mode, and a high-difficulty balance training mode. It should be emphasized that the balance training modes of this application are not limited to only the above three modes, they are only used as examples for illustration, and a balance training mode setting that is more intuitive for a therapist may also be used. Each balance training mode has a set of motion parameters corresponding to it, which may include tilt parameters, such as various tilt angles to be performed, the duration of maintaining various tilt angles, and the transfer frequency of various tilt angles, and rotation angles corresponding to various tilt angles, and so on. By providing several balance training modes, a therapist may select a corresponding balance training mode for training the patient according to the patient's physical condition. Even for therapists who are not experienced enough, they can intuitively select various levels of balance training modes to ensure the effect of balance training.

In some embodiments, the rehabilitation training equipment further includes a first feedback device 50 configured to obtain core muscle strength parameters of the object, and the control device 5 is further configured to: receive the core muscle strength parameters from the first feedback device 50; and send a control signal to the disturbance mechanism 15 based on the core muscle strength parameters, so as to dynamically adjust the balance training modes.

It may be understood that the above first feedback device 50 may be provided on the object bearing portion 16 and electrically connected to the control device 5. After the patient's core muscle strength parameters are obtained by the first feedback device 50, the control device 5 may analyze and process the patient's core muscle strength parameters, so as to provide the patient with a suitable balance training mode as a training manner. Therefore, the balance training mode can be dynamically adjusted (for example, automatic adjustment or semi-automatic adjustment) effectively according to the real-time condition of the patient's core muscle strength parameters during rehabilitation training, and a balance training mode which is more suitable for the patient can be achieved under the adjustment by the disturbance mechanism 15.

In the early stage of the patient's recovery cycle, the patient's core muscle strength performance corresponding to the core muscle strength parameters is unhealthier, and then the patient may perform a lower-difficulty balance training mode. And in the later stage of the patient's recovery cycle, the patient's core muscle performance corresponding to the core muscle strength parameters is healthier, and then the patient may perform a higher-difficulty balance training mode. Through the gradual training of the patient's balance function, the patient can quickly recover. The above manner enables the rehabilitation training equipment to provide patients with a matching and progressive individualized rehabilitation training plan, thereby avoiding the problems of a low balance training efficiency and a long recovery period of patients.

In some embodiments, the control device 5 is further configured to: based on the received core muscle strength parameters, provide at least one of the following prompts associated with the selection of the balance training mode, and these prompts can be used in the selection of the balance training mode so as to provide the necessary feedback information for therapists of different experience levels.

The first prompt information: a prompt of a candidate balance training mode that is adapted to the received core muscle strength parameters.

It may be understood that the prompt related to the candidate refers to the provision of the multiple balance training modes corresponding to the core muscle strength parameters after receiving the parameters. As an example, the balance training modes adapted to the core muscle strength parameters may include a low-difficulty balance training mode and a medium-difficulty balance training mode, etc., and then the therapist can select one of the multiple balance training modes in the prompts to train the patient based on experience. The above manner may provide a certain degree of freedom while providing adaptive and candidate balance training modes, which allows users to select one out of the candidate balance training modes according to their own needs for training according, and of course allows users to select multiple adapted balance training modes to perform transfer training.

The second prompt information: a prompt that the received core muscle strength parameters do not adapt to the currently selected balance training mode.

It may be understood that the first feedback device receives real-time core muscle strength parameters. With the recovery of the patient's physical condition, the core muscle strength performance corresponding to the core muscle strength parameters becomes healthier. When the current training mode no longer adapts to patient's core muscle strength parameters, a prompt information about the incompatibility between the training mode and the core muscle strength parameters is provided to the user, which prompts to change a balance training mode that is adapted to the currently received core muscle strength parameters for training, and the adapted balance training mode can be directly presented to the user, so that the user can directly select the balance training mode adapted to the core muscle strength parameters for training.

The third prompt information: a prompt that allows the user to manually select the balance training mode.

The fourth prompt information: the presentation of a set of motion parameters corresponding to the currently selected balance training mode and a prompt that allows the user to manually adjust the presented set of motion parameters.

It may be understood that, in order to provide experienced therapists with a higher degree of freedom in choosing the balance training mode, the above balance training modes can be manually changed by the user. Besides, the user can be provided with an interface where the user can manually change the mode before training, and then can manually select the desired balance training mode on this interface. In addition, the motion parameters in a set of motion parameters corresponding to the balance training mode can also be changed. That is to say, after the user selects the corresponding balance training mode, multiple motion parameters therein can also be changed. For example, a plus and minus selection module may be set on the display interface for the user to manually set the motion parameters, so as to improve the matching degree of the balance training mode with the actual condition of the patient, and provide the patient with a more suitable training mode.

From the above, the control device 5 provides at least one of the four prompt information related to core muscle strength parameters, to provide the user with multiple choices and improve the matching degree of the balance training mode with the patient's rehabilitation progress.

In some embodiments, the rehabilitation training equipment further includes a plurality of second feedback devices which are configured to obtain the center of gravity deviation parameter of the object. The control device 5 may be further configured to: receive the center of gravity deviation parameter from the plurality of second feedback devices; and send a control signal to the disturbance mechanism 15 based on the received center of gravity deviation parameter, so as to dynamically adjust the balance training modes.

It may be understood that the above second feedback device 52 may be provided on the disturbance mechanism 15 and electrically connected to the control device 5. After the above second feedback device 52 obtains the center of gravity deviation parameter of the patient, the control device 5 can analyze and process the center of gravity deviation parameter of the patient, so as to provide the patient with a suitable balance training mode as a training manner. Therefore, the balance training mode can be dynamically adjusted effectively according to the real-time condition of center of gravity deviation parameter of the patient during rehabilitation training, and a balance training mode which is more suitable for the patient can be achieved under the adjustment by the disturbance mechanism 15.

In the early stage of the patient's recovery cycle, the smaller the above center of gravity deviation parameter is, the worse the balance function of the patient's body is, and then the patient can perform a low-difficulty balance training mode. In the later stage of the patient's recovery cycle, the larger the above center of gravity deviation parameter is, the better the balance function of the patient's body is, and then the patient can perform a high-difficulty balance training mode. Through the gradual training of the patient's balance function, the patient can quickly recover. In this manner, in addition to the core muscle strength parameters, the rehabilitation training equipment also introduces the center of gravity deviation parameter to guide the selection of the balance training mode. For patients in different rehabilitation levels with similar core muscle strength parameters but different center of gravity deviation parameter, a more appropriate rehabilitation training plan can be provided targeted to avoid the problems of a low balance training efficiency and a long rehabilitation cycles for patients.

In some embodiments, the control device 5 is further configured to: based on the received center of gravity deviation parameter, provide at least one of the following prompts associated with the selection of the balance training mode.

The first prompt information: a prompt of a candidate balance training mode that is adapted to the received center of gravity deviation parameter.

It may be understood that the prompt related to the candidate refers to the provision of the multiple balance training modes corresponding to the center of gravity deviation parameter after receiving the parameter. As an example, the balance training modes adapted to the center of gravity deviation parameter may include a low-difficulty balance training mode and a medium-difficulty balance training mode, etc., and then the therapist can select one of the multiple balance training modes in the prompts to train the patient based on experience. The above manner may provide a certain degree of freedom while providing adaptive and candidate balance training modes, which allows users to select one out of the multiple candidate balance training modes according to their own needs for training, and of course, also allows users to select multiple adapted balance training modes to transfer training.

The second prompt information: a prompt that allows the user to manually select the balance training mode.

The third prompt information: the presentation of a set of motion parameters corresponding to the currently selected balance training mode and a prompt that allows the user to manually adjust the presented set of motion parameters.

It may be understood that, in order to provide experienced therapists with a higher degree of freedom in choosing the balance training mode, the above balance training modes can be manually changed by the user. Besides, the user can be provided with an interface where the user can manually change the mode before training, and then can manually select the desired balance training mode on this interface. In addition, the motion parameters in a set of motion parameters corresponding to the balance training mode can also be changed. That is to say, after the user selects the corresponding balance training mode, multiple motion parameters therein can also be changed. For example, a plus and minus selection module can be set on the display interface for the user manually setting the motion parameters, so as to improve the matching degree of the balance training mode with the actual condition of the patient, and provide the patient with a more suitable training mode.

From the above, the control device 5 provides at least one of the three prompt information related to center of gravity deviation parameter, to provide the user with multiple choices and improve the matching degree of the balance training mode with the patient's rehabilitation progress.

Figure 12:
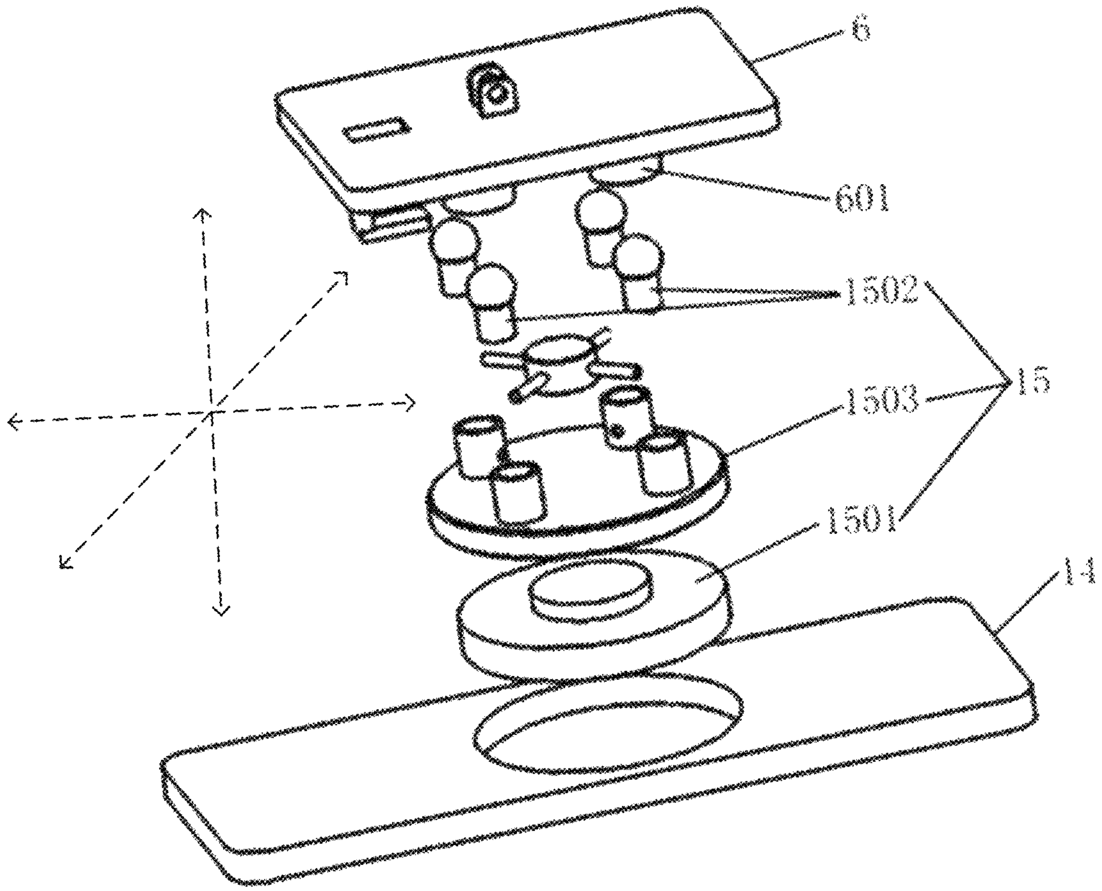
FIG. 12 is a partial exploded view of the rehabilitation training equipment according to the embodiment of the disclosure.

In some embodiments, as shown in FIGS. 11 and 12, the disturbance mechanism 15 includes a rotating base 1501 and a plurality of pushing parts 1502 arranged on the rotating base 1501 in a circumferential direction, wherein each pushing part 1502 is configured as under the control of the control device 5, push the supporting part 6 in an independent process in the up and down direction, to perform tilt motion of the supporting part 6.

It may be understood that the various pushing parts 1502 are independent of each other, and the multiple pushing parts 1502 can cooperate to apply an upward pushing force to the supporting part 6, so as to make the supporting part 6 tilt. Specifically, at least two of the above pushing parts 1502 cooperate to apply an upward force to one side of the supporting part 6, and at least two other pushing parts 1502 cooperate to apply an upward force to the other side of the supporting part 6. That is, the number of the pushing parts 1502 may be at least 4, so as to apply a stable pushing force to the opposite sides of the supporting part 6 and to stably form an inclined plane with a required tilt angle.

With reference to FIG. 12, four pushing parts 1502 are taken as an example for illustration in FIG. 12. The two pushing parts 1502 located on one side of the supporting part 6 can stably support the side of the supporting part 6, and the two pushing parts 1502 are arranged in pairs, so that the supporting part 6 can be tilted in a symmetrical manner. When only one pushing part 1502 is tilted, the supporting part 6 can also be tilted in an asymmetrical manner.

In some embodiments, as shown in FIGS. 11 and 12, the supporting part 6 is provided with abutment parts 601 corresponding to the plurality of pushing parts 1502 at lower surface thereof, and the upper surface of the pushing parts 1502 and the abutment parts 601 fit.

It may be understood that the above abutment parts 601 are used to increase the contact area between the pushing parts 1502 and the supporting part 6 so as to stably act on the supporting part 6 through the pushing parts 1502 and cause the supporting part 6 to tilt. The abutment parts 601 may be formed by extending the lower surface of the supporting part 6 downward, that is, the abutment parts 601 are formed integrally with the supporting part 6. The abutment parts 601 may be formed with an abutment cavity, and the upper end of the pushing parts 1502 can extend into the abutment cavity, so that the pushing parts 1502 and the abutment parts 601 can be stably attached to each other through the abutment cavity, thereby avoiding the pushing parts 1502 from separating from the supporting part 6.

In some embodiments, as shown in FIGS. 11 and 12, the end of the pushing parts 1502 is spherical, and the abutment parts 601 are formed with a groove (not shown in the figure) adapted to the spherical shape. The upper end of the pushing parts 1502 shown in FIG. 12 is the aforementioned end, and the spherical end can be matched with the spherical groove on the abutment parts 601 to realize rotation and stable fit.

In some embodiments, as shown in FIG. 12, the rotating base 1501 is rotatablely disposed in the base 14. The multiple pushing parts 1502 can be provided on the mounting base 1503 and the rotating base 1501 supports the mounting base 1503 to bring the pushing parts 1502 thereon to rotate accordingly.

In some embodiments, the disturbance mechanism 15 further includes a translation assembly (not shown in the figures), so that the disturbance mechanism 15 is connected to the base 14 in a translational manner. The above translation assembly can be arranged between the rotating base 1501 and the mounting base 1503. The rotating base 1501 brings the mounting base 1503 and the translation assembly to rotate, and the mounting base 1503 can slide on the translation assembly along a length direction, so that the disturbance mechanism 15 can bring the supporting part 6 and the object bearing part 16 thereon to the designated operating position as their translational motion and rotation motion, which improves the convenience of the rehabilitation training equipment and facilitates the user's operation and use.

In some embodiments, each pushing part 1502 is composed with an independent hydraulic cylinder and includes a solenoid valve (not shown in the figure) installed near the liquid inlet of each hydraulic cylinder. The control device 5 realizes independent control of the procession of each hydraulic cylinder by independently controlling each solenoid valve.

This application does not specifically limit the number of pushing parts 1502. Taking 4 pushing parts 1502 as shown in FIG. 12 as an example, the four pushing parts 1502 respectively have corresponding solenoid valves, and each solenoid valve is independently connected to the control device 5, so that the control device 5 can independently control the four solenoid valves, thereby respectively driving the corresponding hydraulic cylinders for telescopic movement, so as to provide multiple modes that can operate independently.

In some embodiments, the object bearing part 16 may at least include a cushion device provided on the supporting part 6. The patient can sit on the cushion device, and under the tilt and rotation disturbance of the supporting part 6 by the disturbance mechanism 15, the patient can train his own balance function under the support of the cushion device. The above object bearing part 16 may also include a leg aid device for supporting the patient's feet and a back placement device for supporting the back, which will be described in details below and will not be repeated here.

According to some embodiments of the present disclosure, a rehabilitation training system is provided. The rehabilitation training system includes various rehabilitation training equipments and their combinations in some embodiments of the present disclosure described above.

At least one of the rehabilitation training equipment for multiple postures in each embodiment can be combined with at least one of the rehabilitation training equipments that automatically apply disturbances in each embodiment to form the rehabilitation training system. In some embodiments, in the case where the rehabilitation training system includes a supporting platform, the supporting platform is provided above the base 14 and is used to support the object of rehabilitation training (that is, the patient), and the supporting platform may include the supporting part 6 in the various embodiments of the present disclosure, and one or more of the cushion device 4, the back placement device 2, and the leg aid device 3. In FIG. 11, a supporting platform including a supporting part 6 (such as a support plate) and a cushion device 4 connected thereto is taken as an example, and the supporting platform of this structure is taken as an example in the following embodiments to describe the structure of the rehabilitation training system, but the present disclosure is not limited to this.

The above rehabilitation training system adjusts the rotation angles between the back placement device 2, the leg aid device 3 and the cushion device 4 through the driving device 1, so that the rehabilitation training system can realize a posture training mode selected from multiple posture training modes including the standing mode, the sitting-up mode, and the lying mode for training, and the disturbance device may push the supporting part 6 to tilt and rotate relative to the base 14, which cancels the current need for the therapist to manually and suddenly push or shake to impose external force interference on the patient and enables the rehabilitation training system to dynamically adjust the posture training mode and the balance training mode according to the different physical conditions of the patient. Thus the patients may complete a variety of posture training modes and balance training modes without the help of outsiders, thereby saving labor costs and enriching the patient's rehabilitation environment. And, according to the core muscle strength parameters of the human body acquired by the first feedback device, the above control device 5 may adjust the rehabilitation training system to enter a posture training mode adapted to the patient's core muscle strength parameters, which enables the rehabilitation training system to dynamically adjust the posture training modes according to the patient's different physical conditions, quickly helps the paralyzed patient to restore core muscle strength and balance, facilitates to shorten the recovery period of the patient. Besides, the above disturbance device can simultaneously apply balance training modes related to both tilt disturbance and rotation disturbance to the patient, and provides enriched rehabilitation training environment for the patient.

In some embodiments, the object bearing part 16 includes the cushion device 4, the back placement device 2, and the leg aid device 3 (as shown in FIGS. 1 to 4) of the various embodiments of the present disclosure, and two opposite sides of the cushion device 4 are rotatablely connected to the back placement device 2 and the leg aid device 3 respectively. The rehabilitation training system further includes a driving device 1, and the driving device 1 is configured to adjust the rotation angles between the back placement device 2, the leg aid device 3 and the cushion device 4, so as to realize the posture training mode selected from multiple posture training modes including standing mode, sitting-up mode and lying mode. In some embodiments, the driving device 1 may be provided on the supporting part 6.

In some embodiments, the control device 5 is further configured to: receive the core muscle strength parameters from the first feedback device 50; based on the received core muscle strength parameters, send a control signal to the disturbance mechanism 15 and the driving device 1 to dynamically adjust balance training mode and posture training mode.

It may be understood that different patients have different degrees of paralysis, and for patients with less paralysis, after the above first feedback device 50 obtains the patient's core muscle strength parameters, the control device 5 can analyze and process the patient's strong core muscle strength parameters and provide the patient with a training manner with a low degree of assistance. In this manner, it can effectively adjust the posture training modes dynamically according to the real-time condition of the patient's core muscle strength parameters during rehabilitation training, adjust the driving device 1 to be posture training mode more suitable for the patient, and avoid the problems of a low training efficiency and a long recovery period of the patient.

It may be understood that the above first feedback device may be provided on the object bearing part 16 and electrically connected to the control device 5. After the patient's core muscle strength parameters are obtained by the first feedback device, the control device 5 can analyze and process the patient's core muscle strength parameters, so as to provide the patient with a suitable balance training mode as a training method. Therefore, the balance training mode can be dynamically adjusted effectively according to the real-time condition of the patient's core muscle strength parameters during rehabilitation training, and a balance training mode which is more suitable for the patient can be achieved under the adjustment by the disturbance mechanism 15.

Besides, although exemplified embodiments are described in present disclosure, the scope of which includes any and all embodiments, with the equal elements as present disclosure, with modifications, omitment, combinations (e.g., solutions across various embodiments) based on the embodiments in present disclosure. The elements in the claims should be explained broadly based on the language adopted in the claims, without limited to the examples described in the description or during the implementation of present application, and the examples thereof should be explained as being non-exclusive. Thus, the description and the examples intend to be considered as instances, and the true scope and spirit are indicated by the following claims and the full scope of its equivalents.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The above embodiments are only exemplary embodiments of the disclosure, and are not used to limit the disclosure. The scope of protection of the disclosure is defined by the claims. Those skilled in the art can make various modifications or equivalent substitutions to the disclosure within the essence and protection scope of the disclosure, and such modifications or equivalent substitutions should also be regarded as falling within the protection scope of the disclosure.

What is claimed is:

1. A rehabilitation training equipment, comprising:

a driving device;

a back placement device;

a leg aid device;

a cushion device, the opposite sides of which are rotatably connected to the back placement device and the leg aid device respectively, and the driving device is configured to adjust rotation angles between the back placement device, the cushion device, and the leg aid device, to realize a posture training mode selectable from multiple posture training modes of the rehabilitation training equipment including standing mode, sitting-up mode and lying mode;

a first feedback device that is installed at one or more of the back placement device, leg aid device or cushion device, and is configured to obtain core muscle strength parameters of the human body, wherein the first feedback device includes a pressure sensor and/or a torque sensor;

a control device that is electrically connected to the first feedback device and the driving device, and the control device includes a storage storing computer-executable instructions and a processor, the processor executes the computer-executable instructions to obtain the core muscle strength parameters and send a control signal to the driving device;

a supporting part, wherein the driving device includes a multi-stage hydraulic cylinder provided on the supporting part, the leg aid device is fixedly provided on one side of the supporting part, the multi-stage hydraulic cylinder is electrically connected to the control device, one end of the multi-stage hydraulic cylinder is hinged to the cushion device, and the control device is configured to control the multi-stage hydraulic cylinder to raise or lower the cushion device;

a first gear assembly fixedly provided on a side of the cushion device connected to the leg aid device; and a second gear assembly rotatably provided on the supporting part and including a transmission connection to the first gear assembly, wherein the driving device further includes a first motor and a first output shaft with a transmission connection to the second gear assembly, so as to bring the second gear assembly and the first gear assembly to rotate via the first output shaft to rotate the cushion device relative to the leg aid device.

2. The rehabilitation training equipment according to claim 1, wherein the driving device is further configured to adjust the rotation angles to realize an intermediate mode as the selected posture training mode.

3. The rehabilitation training equipment according to claim 2, wherein the driving device is further configured to adjust the rotation angles to realize a transfer training process between at least two posture training modes of the multiple posture training modes.

4. The rehabilitation training equipment according to claim 1, wherein the control device is further configured to: send to the driving device a control signal indicating lower degree of assistance in the posture training mode.

5. The rehabilitation training equipment according to claim 1, wherein the control device is further configured to be communicably connected to a user terminal to receive user input from the user terminal.

6. The rehabilitation training equipment according to claim 1, further comprising a third gear assembly rotatably provided on a side of the cushion device connected to the back placement device, and a fourth gear assembly fixedly provided on the cushion device with a transmission connection to the third gear assembly, wherein the driving device further includes a second motor and a second output shaft with a transmission connection to the third gear assembly, so as to bring the third gear assembly and the fourth gear assembly to rotate through the second output shaft to rotate the back placement device relative to the cushion device.

7. The rehabilitation training equipment according to claim 1, wherein the back placement device includes:

- a backrest and a plurality of upper body fixing straps elastically connected to the backrest to fix an upper body of the human body, and the plurality of upper body fixing straps are arranged at intervals along a length direction of the backrest; and
- a plurality of movable mounting bases for installing the upper body fixing straps, wherein the movable mounting bases are arranged corresponding to the upper body fixing straps, the backrest is opened with a plurality of mounting grooves corresponding to the plurality of movable mounting bases, and each mounting groove is provided therein with an elastic member connected to the corresponding movable mounting base.

8. The rehabilitation training equipment according to claim 7, further comprising a desk assembly provided in front of the backrest and two telescopic brackets respectively provided on opposite sides of the backrest, wherein the desk assembly includes a desk board pivotally connected to the two telescopic brackets and an operation handle provided on the desk board, and the operation handle is electrically connected to the control device to send an operation signal to the control device for controlling the posture training modes of the rehabilitation training equipment.

9. The rehabilitation training equipment according to claim 7, wherein the leg aid device includes a leg support assembly and lower body fixing straps elastically connected to the leg support assembly to fix a lower body of the human body, wherein the leg support assembly includes a leg support plate, a toe cover adapted to correspond to toes of the human body, a plurality of fixing plates adapted to correspond to insteps of the human body, and a heel cover adapted to correspond to heels of the human body, and wherein the heel cover is connected to the leg support plate, and the plurality of the fixing plates are respectively arranged on the heel cover and the toe cover in a detachable manner.

10. A rehabilitation training system, comprising the rehabilitation training equipment according to claim 1.

11. The rehabilitation training system according to claim 10, wherein in a configuration where the rehabilitation training system includes a supporting platform, the supporting platform includes a supporting part and an object bearing part connected thereto, the object bearing part includes the cushion device, the back placement device and the leg aid device, the cushion device at opposite sides thereof are rotatably connected to the back placement device and the leg aid device respectively, and wherein the rehabilitation training system further includes the driving device which is configured to adjust rotation angles between the back placement device, the cushion device and the leg aid device, so as to achieve a posture training mode selectable of the multiple posture training modes of the rehabilitation training equipment including a standing mode, a sitting-up mode and a lying mode.

12. The rehabilitation training system according to claim 11, wherein the rehabilitation training equipment further includes the first feedback device configured to obtain the core muscle strength parameters of the object and provided at one or more of the back placement device, the leg aid device, or the cushion device, and

- wherein the control device is further configured to: receive the core muscle strength parameter from the first feedback device based on the received core muscle strength parameters, and send a control signal to the disturbance mechanism and the driving device to dynamically adjust the balance training mode and the posture training modes.

13. A rehabilitation training system comprising rehabilitation training equipment, comprising:

- a base;
- a supporting platform provided above the base and used to support an object for rehabilitation training;
- a disturbance mechanism adapted to the base and the supporting platform; and
- a control device including a storage storing computer-executable instructions and a processor, the processor executing the computer-executable instructions to control the disturbance mechanism to push the supporting platform to perform a motion at least including a tilt motion relative to the base, wherein in a configuration where the rehabilitation training system includes the supporting platform, the supporting platform includes a supporting part and an object bearing part connected thereto, the object bearing part includes a cushion device, a back placement device and a leg aid device, the cushion device at opposite sides thereof are rotatably connected to the back placement device and the leg aid device respectively; and
- a driving device configured to adjust rotation angles between the back placement device, the cushion device and the leg aid device, so as to achieve a posture training mode selectable from a plurality of posture training modes of the rehabilitation training equipment including a standing mode, a sitting-up mode and a lying mode, wherein the driving device further includes a multi-stage hydraulic cylinder provided on the supporting part, the leg aid device is fixedly provided on one side of the supporting part, the multi-stage hydraulic cylinder is electrically connected to the control device, one end of the multi-stage hydraulic cylinder is hinged to the cushion device, and the control device is configured to control the multi-stage hydraulic cylinder to raise or lower the cushion device, and
- wherein the rehabilitation training equipment further includes a first gear assembly fixedly provided on a side of the cushion device connected to the leg aid device, and a second gear assembly rotatably provided on the supporting part and includes a transmission connection to the first gear assembly, wherein the driving device further includes a first motor and a first output shaft with a transmission connection to the second gear assembly, so as to bring the second gear assembly and the first gear assembly to rotate via the first output shaft to rotate the cushion device relative to the leg aid device.

14. The rehabilitation training system according to claim 13, wherein the control device is configured to control the disturbance mechanism to push the supporting platform to perform a motion at least including the tilt motion and a rotation motion relative to the base.

15. The rehabilitation training system according to claim 13, wherein the supporting part is supported above the base via the disturbance mechanism and connected to the object bearing part, so that the object bearing part moves along with a movement of the supporting part.

16. The rehabilitation training system according to claim 13, wherein the control device is further configured to control the disturbance mechanism to push the supporting platform with motion parameters, and the motion parameters at least includes tilt parameters, comprising each tilt angle of the tilt motion to be performed, duration of maintaining each tilt angle, and a shift frequency of each tilt angle.

17. The rehabilitation training system according to claim 16, wherein the motion parameter further includes a rotation angle corresponding to each tilt angle.

18. The rehabilitation training system according to claim 13, wherein the control device is further configured to: provide several balance training modes, so that each balance training mode has a corresponding set of motion parameters; based on the selected balance training mode, control the disturbance mechanism to push the supporting platform with a corresponding set of motion parameters.

19. The rehabilitation training system according to claim 18, wherein the rehabilitation training equipment further includes a first feedback device including a pressure sensor and/or a torque sensor and configured to obtain core muscle strength parameters of the object, wherein the control device is further configured to: receive the core muscle strength parameters from the first feedback device; based on the received core muscle strength parameters, send a control signal to the disturbance mechanism to dynamically adjust the balance training mode.

20. The rehabilitation training system according to claim 18, wherein the rehabilitation training equipment further includes a plurality of second feedback devices including a pressure sensor and/or a torque sensor and configured to obtain a center of gravity deviation parameter of the object, wherein the control device is further configured to: receive the center of gravity deviation parameter from the plurality of second feedback devices based on the received center of gravity deviation parameter, and send a control signal to the disturbance mechanism to dynamically adjust the balance training mode.

21. The rehabilitation training system according to claim 13, wherein the disturbance mechanism includes a rotating base and a plurality of pushing parts provided on the rotating base in a circumferential direction, and each pushing part is configured to push the supporting platform in an independent process in an up and down direction under control of the control device, to perform the tilt motion of the supporting platform, wherein each pushing part includes a hydraulic cylinder and a solenoid valve installed near a liquid inlet of the hydraulic cylinder.

22. The rehabilitation training system according to claim 13, wherein the rehabilitation training equipment further includes a first feedback device including a pressure sensor and/or a torque sensor and configured to obtain core muscle strength parameters of the object and provided at one or more of the back placement device, the leg aid device, or the cushion device, and wherein the control device is further configured to: receive the core muscle strength parameter from the first feedback device based on the received core muscle strength parameters and send a control signal to the disturbance mechanism and the driving device to dynamically adjust the balance training mode and the posture training modes.

* * * * *